United States Patent
Suto et al.

(10) Patent No.: US 9,160,879 B2
(45) Date of Patent: Oct. 13, 2015

(54) LIGHT GUIDING BODY, ILLUMINATING DEVICE, IMAGE READING APPARATUS AND IMAGE FORMING APPARATUS

(71) Applicant: Sharp Kabushiki Kaisha, Osaka-shi, Osaka (JP)

(72) Inventors: Yasuhiro Suto, Osaka (JP); Shohichi Fukutome, Osaka (JP); Masahiro Imoto, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/328,879

(22) Filed: Jul. 11, 2014

(65) Prior Publication Data
US 2015/0055195 A1    Feb. 26, 2015

(30) Foreign Application Priority Data

Aug. 20, 2013  (JP) .................................. 2013-170636
Aug. 22, 2013  (JP) .................................. 2013-172269

(51) Int. Cl.
*H04N 1/04* (2006.01)
*H04N 1/028* (2006.01)
*F21V 8/00* (2006.01)

(52) U.S. Cl.
CPC .......... *H04N 1/02815* (2013.01); *G02B 6/0038* (2013.01); *G02B 6/0061* (2013.01)

(58) Field of Classification Search
CPC . H04N 1/02815; G02B 6/0038; G02B 6/0061
USPC ................................... 358/475, 498, 497, 474
See application file for complete search history.

(56) References Cited

U.S. PATENT DOCUMENTS

| | | | | |
|---|---|---|---|---|
| 5,969,343 A | * | 10/1999 | Nakamura et al. | ........ 250/227.31 |
| 6,351,594 B1 | | 2/2002 | Nakamura et al. | |
| 7,555,194 B2 | * | 6/2009 | Ikeda et al. | .................... 385/146 |
| 2009/0086509 A1 | | 4/2009 | Omori et al. | |
| 2010/0124439 A1 | | 5/2010 | Suto et al. | |
| 2012/0250111 A1 | | 10/2012 | Hozono | |
| 2013/0250373 A1 | * | 9/2013 | Takeuchi | ........................ 358/474 |
| 2013/0314756 A1 | | 11/2013 | Amemiya et al. | |

FOREIGN PATENT DOCUMENTS

| | | |
|---|---|---|
| JP | 10-133026 | 5/1998 |
| JP | 11-134918 | 5/1999 |
| JP | 2000-89030 A | 3/2000 |

(Continued)

*Primary Examiner* — Houshang Safaipour
(74) *Attorney, Agent, or Firm* — Birch, Stewart, Kolasch & Birch, LLP

(57) ABSTRACT

A light guiding body includes a long translucent body, a light incident surface formed at an end of the body in a longitudinal direction of the body, a light emitting surface formed on one side surface of the body along the longitudinal direction of the body, and a light emitting quantity adjusting portion formed on the other side surface of the body along the longitudinal direction of the body so as to be opposite to the light emitting surface. The light guiding body guides, in the body, light incident to the light incident surface, reflects the light by the light emitting quantity adjusting portion, and emits the light from the light emitting surface. A width of the light emitting quantity adjusting portion of the body in a direction perpendicular to the longitudinal direction of the body is varied according to a position in the width in the longitudinal direction.

10 Claims, 18 Drawing Sheets

(56) References Cited

FOREIGN PATENT DOCUMENTS

| JP | 2009-81094 A | 4/2009 |
|---|---|---|
| JP | 2010-119054 A | 5/2010 |
| JP | 2011-188080 A | 9/2011 |
| JP | 2011-188166 A | 9/2011 |
| JP | 2012-160866 A | 8/2012 |
| JP | 2012-212069 A | 11/2012 |

* cited by examiner

Emitted light quantity distribution from light guiding body

Transmitted light quantity distribution of imaging lens

Received light quantity distribution of CCD

FIG.13 (c) Emitted light quantity distribution from light guiding body
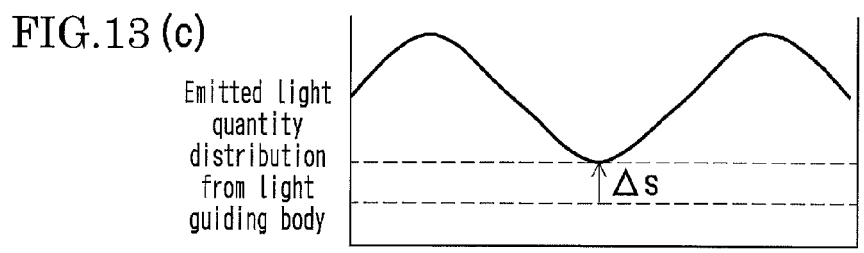
FIG.13 (d) Transmitted light quantity distribution of imaging lens
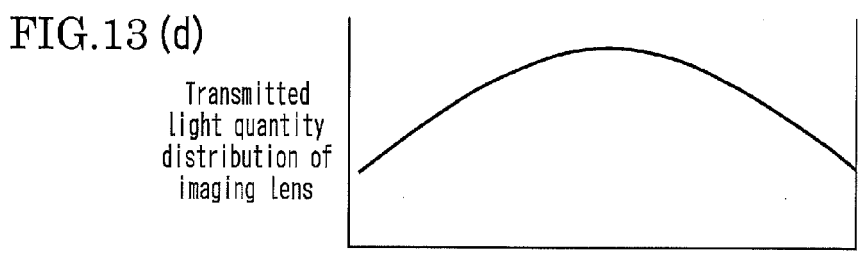
FIG.13 (e) Received light quantity distribution of CCD
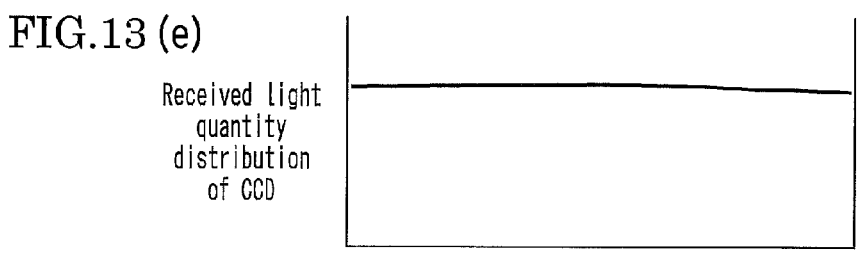

LIGHT GUIDING BODY, ILLUMINATING DEVICE, IMAGE READING APPARATUS AND IMAGE FORMING APPARATUS

CROSS-REFERENCE TO RELATED APPLICATIONS

This application claims priority on Patent Application No. 2013-172269 filed in Japan on Aug. 22, 2013 and Patent Application No. 2013-170636 filed in Japan on Aug. 20, 2013, the entire contents of which are herein incorporated by reference.

BACKGROUND OF THE INVENTION

1. Field of the Invention

The present invention relates to a light guiding body used for illumination, an illuminating device including the light guiding body, an image reading apparatus including the illuminating device, and an image forming apparatus.

2. Description of the Related Art

As this kind of illuminating device, for example, a device disclosed in JP 2000-089030 A (hereinafter referred to as "Patent Document 1") is known. In Patent Document 1, a light emitting surface is formed on a side surface of a columnar-shaped light guiding body along the longitudinal direction thereof. Also, a sawtooth-shaped light reflecting surface is formed on the other side surface of the light guiding body along the longitudinal direction thereof, thus, the light emitting surface and the light reflecting surface are opposite to each other. Then, light from a light emitting device (light source) is incident to an end surface of the light guiding body in the longitudinal direction so that the light is propagated in the light guiding body. The light is directly emitted from the light emitting surface of the light guiding body, and furthermore is reflected by the light reflecting surface so as to be emitted from the light emitting surface. Thus, a surface of an original is illuminated by the emitted light. Also, an inclination angle distribution of the respective inclined surfaces that form the sawtooth-shaped light reflecting surface is adjusted so that an emitted light quantity distribution emitted from the light emitting surface is suitably set.

Also, in JP 2011-188080 A (hereinafter referred to as Patent Document 2), a light emitting surface having a cross sectional shape of a semicircle is formed on a side surface of a columnar-shaped light guiding body along the longitudinal direction thereof. A light scattering surface is formed on the other side surface of the light guiding body along the longitudinal direction thereof, thus, the light emitting surface and the light scattering surface are opposite to each other. Also, a plurality of light emitting devices is disposed on an end surface of the light guiding body. Then, light from each light emitting device is incident to the end surface of the light guiding body so that the light is propagated in the light guiding body. The light is directly emitted from the light emitting surface, and furthermore is reflected by the light scattering surface so as to be emitted from the light emitting surface. Thus, a surface of an original is illuminated by the emitted light. Also, positions of the respective light emitting devices are adjusted so that the emitted light quantity distribution emitted from the light emitting surface is suitably set.

In this kind of image reading apparatus, the original is illuminated by an illuminating device below a glass while transported on the glass in the sub-scanning direction, thus an image sensor such as a CCD (Charge Coupled Device) reads the original by repeatedly scanning the original in the main-scanning direction. Or, the original is positioned and placed on the glass, and while the illuminating device and the image sensor are moved in the sub-scanning direction below the glass, the illuminating device illuminates the original so that the image sensor reads the original by repeatedly scanning the original in the main-scanning direction. Various illuminating devices that illuminate the original are known, for example, a fluorescent lamp and an LED array are used.

In JP 2010-119054 A (hereinafter referred to as Patent Document 3), JP 2012-160866 A (hereinafter referred to as Patent Document 4) and JP 2012-212069 A (hereinafter referred to as Patent Document 5), LEDs are disposed at both ends of a columnar-shaped light guiding body. Light emitted from each LED is incident from the corresponding end of the light guiding body to the inside thereof and guided so as to be emitted from a light emitting surface of the light guiding body along the longitudinal direction thereof. Thus, the emitted light illuminates an original.

However, it is not easy to adjust the inclination angle distribution of the respective inclined surfaces that form the sawtooth-shaped light reflecting surface as shown in Patent Document 1. Regardless of how the inclination angle distribution of the respective inclined surfaces is adjusted, the emitted light quantity distribution not varies smoothly and a step occurs in the variation of the emitted light quantity distribution.

Also, when a plurality of light emitting devices is disposed on the end surface of the light guiding body as shown in Patent Document 2, the number of components and the costs are increased. Furthermore, in order to more appropriately set the emitted light quantity distribution emitted from the light emitting surface, it is necessary to further increase the number of the light emitting devices. Accordingly, the number of the components and the costs are more and more increased.

When the LED is disposed in the vicinity of the end of the light guiding body as shown in Patent Documents 3-5, the light guiding body may be heated and deformed by heat generation of the LED, because the light guiding body is made of synthetic resin such as acrylic resin. Also, recently, an original read speed in the image reading apparatus has been increased, and accordingly, a light quantity to illuminate the original has been increased. Thus, heat generation of the LED is increased and the lifetime thereof tends to be shortened. For this reason, a substrate with high heat dissipation efficiency is adopted to mount the LED, or a heat dissipation plate is overlapped with the substrate.

However, in Patent Document 3, the light guiding body, the LED substrate, the heat dissipation plate and the like are mounted on a frame. Part of the frame is located below the light guiding body and the LED substrate. Thus, air convection is decreased around the end of the light guiding body, the LED substrate, the heat dissipation plate and the like. This results in low heat dissipation efficiency of the LED substrate and the heat dissipation plate.

In Patent Documents 4 and 5, the heat dissipation plate extends outside the frame or the casing, thus heat dissipation efficiency of the heat dissipation plate is improved. However, since the LEDs and the light guiding body are disposed on the wall or in the inside of the frame or the casing, heat dissipation efficiency of the light guiding body and the LEDs is low.

The present invention was made in consideration of the above conventional problems. A first object of the present invention is to provide a light guiding body in which the emitted light quantity distribution can be smoothly varied and the number of components and the costs are not increased, an illuminating device that includes the light guiding body, and an image reading apparatus that includes the illuminating device. A second object of the present invention is to provide an image reading apparatus and an image forming apparatus in which high heat dissipation efficiency of the light guiding body can be maintained with a simple configuration.

SUMMARY OF THE INVENTION

In order to resolve the above problems, a light guiding body of the present invention includes a long translucent body, a light incident surface formed at an end of the body in a longitudinal direction of the body, a light emitting surface formed on one side surface of the body along the longitudinal direction of the body, and a light emitting quantity adjusting portion formed on the other side surface of the body along the longitudinal direction of the body so as to be opposite to the light emitting surface. The light guiding body is configured to guide, in the body, light that is incident to the light incident surface, reflect the light by the light emitting quantity adjusting portion, and emit the light from the light emitting surface. A width of the light emitting quantity adjusting portion of the body in a direction perpendicular to the longitudinal direction of the body is varied according to a position in the width in the longitudinal direction of the body.

In the above configuration of the light guiding body of the present invention, the width of the light emitting quantity adjusting portion in the direction perpendicular to the longitudinal direction of the body is varied according to the position in the light guiding body in the longitudinal direction of the body. Light is incident to the light incident surface of the body and guided in the body so as to be reflected by the light emitting quantity adjusting portion, thereby emitted from the light emitting surface. Thus, a light reflecting quantity of the light emitting quantity adjusting portion increases as the width of the light emitting quantity adjusting portion becomes wider, and accordingly, a light emitting quantity from the light emitting surface increases. On the other hand, the light reflecting quantity of the light emitting quantity adjusting portion decreases as the width of the light emitting quantity adjusting portion becomes narrower, and accordingly, the light emitting quantity from the light emitting surface decreases. For this reason, when the width of the light emitting quantity adjusting portion is changed according to the position in the light guiding body in the longitudinal direction of the body, the light emitting quantity, which is reflected by the light emitting quantity adjusting portion and emitted from the light emitting surface, is also varied according to the position in the longitudinal direction of the body. Therefore, the emitted light quantity distribution in the longitudinal direction of the body can be suitably set by changing the width of the light emitting quantity adjusting portion according to the position in the light guiding body in the longitudinal direction of the body.

In the light guiding body of the present invention, a width of the body in the direction perpendicular to the longitudinal direction of the body may be varied, together with the width of the light emitting quantity adjusting portion, according to a position in the width of the body in the longitudinal direction of the body.

Here, the width of the body is varied together with the width of the light emitting quantity adjusting portion according to the position in the longitudinal direction of the body. In this case also, the light emitting quantity emitted from the light emitting surface by reflected by the light emitting quantity adjusting portion is varied according to the position in the longitudinal direction of the body. Thus, the emitted light quantity distribution in the longitudinal direction of the body can be suitably set.

Furthermore, in the light guiding body of the present invention, a width of the other side surface of the body in the direction perpendicular to the longitudinal direction of the body may be fixed, and a light reflecting surface may be formed in a region of the other side surface where the light emitting quantity adjusting portion is not formed.

When such a light reflecting surface is provided, the width of the light emitting quantity adjusting portion is varied according to the position in the light guiding body in the longitudinal direction of the light guiding body, thus the emitted light quantity distribution in the longitudinal direction of the light guiding body can be suitably set.

Also, in the light guiding body of the present invention, the width of the light emitting quantity adjusting portion in the direction perpendicular to the longitudinal direction of the boy may be gradually narrowed as the position in the width becomes closer to the end of the body in the longitudinal direction of the body.

In this case, the light emitting quantity can be decreased as the position becomes closer to the end of the body in the longitudinal direction of the body.

An illuminating device of the present invention includes the light guiding body described above and a light emitting device that emits light to the light incident surface of the light guiding body.

An image reading apparatus of the present invention includes the illuminating device described above, and a reading portion that reads an irradiated object illuminated by the light emitted from the light emitting surface of the light guiding body of the illuminating device.

This illuminating device and image reading apparatus can also obtain the same actions and effects as the light guiding body of the present invention as described above.

Also, the image reading apparatus of the present invention includes: a long translucent light guiding body; a light emitting device disposed on an end of the light guiding body in a longitudinal direction of the light guiding body; a reading portion reading an irradiated object; and a casing supporting the light guiding body. The image reading apparatus is configured to make light emitted from the light emitting device incident to a light incident surface formed at the end of the light guiding body in the longitudinal direction of the light guiding body, guide the light in the light guiding body, illuminate the irradiated object by the light emitted from a light emitting surface of the light guiding body along the longitudinal direction of the light guiding body, make a reflected light reflected by the irradiated object incident to the reading portion through an inside of the casing, and read the irradiated object by the reading portion. The end of the light guiding body protrudes outside the casing from a side end of the casing.

In the above configuration of the image reading apparatus of the present invention, the end of the light guiding body protrudes outside the casing from the side end of the casing. Therefore, the end of the light guiding body is disposed outside the casing, thereby the light emitting device disposed on the end of the light guiding body is also disposed outside the casing. Thus, heat hardly stays in the vicinity of the end of the light guiding body and the light emitting device. Therefore, the heat dissipation efficiency of the end of the light guiding body and the light emitting device is improved.

The image reading apparatus of the present invention may further include a supporting member that supports the light guiding body and the light emitting device, which is disposed in an opening of the casing that faces the irradiated object. An end of the supporting member may protrude, together with the light guiding body, outside the casing from the side end of the casing.

When the end of the above supporting member is disposed outside the casing, the end of the light guiding body and the light emitting device are also disposed outside the casing.

Furthermore, in the image reading apparatus of the present invention, a heat dissipation plate that dissipates heat of the light emitting device may be disposed at the end of the supporting member.

In this case, since the heat dissipation plate is disposed outside the casing, it realizes high heat dissipation efficiency and suppresses temperature rises of the end of the light guiding body and the light emitting device.

Also, in the image reading apparatus of the present invention, a substrate on which the light emitting device is mounted and a heat dissipation plate that makes contact with the substrate may be disposed at the end of the supporting member.

Furthermore, in the image reading apparatus of the present invention, spaces may be provided in an outward direction opposite to the light guiding body relative to the heat dissipation plate, in a vertical direction of the heat dissipation plate, and on both sides of the heat dissipation plate in a horizontal direction thereof perpendicular to the outward direction and the vertical direction.

In this case, the heat dissipation plate realizes high heat dissipation efficiency and further suppresses temperature rises of the end of the light guiding body and the light emitting device.

Also, in the image reading apparatus of the present invention, the supporting member may be disposed along the longitudinal direction of the light guiding body and may have a slit through which the reflected light reflected by the irradiated object passes to enter the inside of the casing. The slit may extend outside the casing.

When the slit of the above supporting member extends outside the casing, air is convected through the slit. Thus, it is possible to further improve heat dissipation efficiency of the end of the light guiding body, the light emitting device, the substrate, the heat dissipation plate and the like.

An image forming apparatus of the present invention includes: the above-described image reading apparatus; and a printing unit that prints, on a recording sheet, an image on the irradiated object and read by the image reading apparatus.

This image forming apparatus can also obtain the same actions and effects as the image reading apparatus of the present invention as described above.

DESCRIPTION OF THE PREFERRED EMBODIMENTS

Hereinafter, description will be given on embodiments of the present invention with reference to the drawings.

Figure 1:
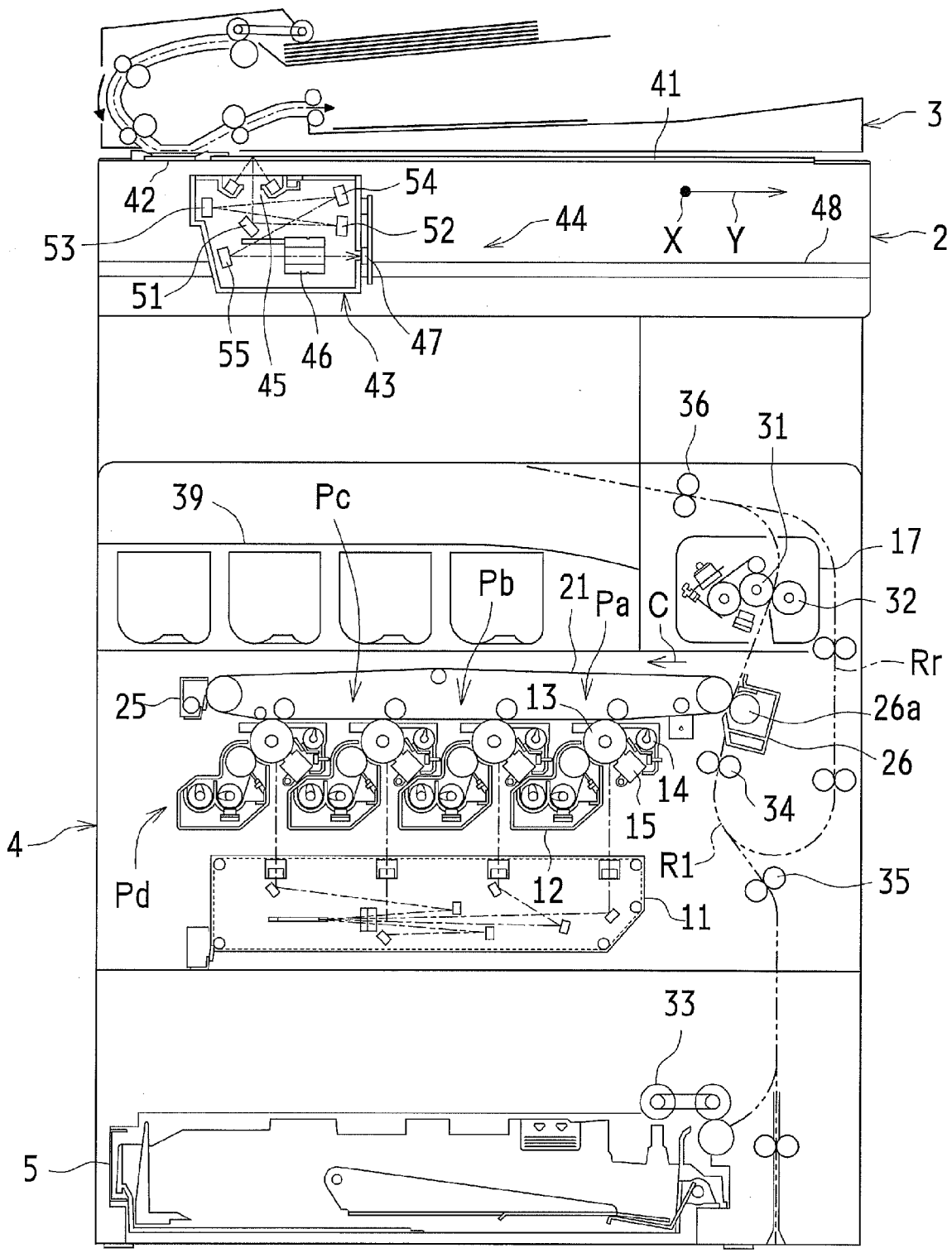
FIG. 1 is a cross-sectional view showing an image forming apparatus including a first embodiment of an image reading apparatus of the present invention.

FIG. 1 is a cross-sectional view showing an image forming apparatus including the first embodiment of an image reading apparatus of the present invention. The image forming apparatus 1 has a copy function to read an original and print the read original on a recording sheet. The image forming apparatus 1 includes, for example, an image reading apparatus 2, an original transport apparatus 3, a printing unit 4 and a sheet feed cassette 5.

Image data processed in the image forming apparatus 1 corresponds to a color image using colors consisting of black (K), cyan (C), magenta (M) and yellow (Y), or corresponds to a monochrome image using a single color (e.g. black). Accordingly, in the printing unit 4, four development devices 12, four photosensitive drums 13, four drum cleaning devices 14 and four charging units 15 are provided so as to form four types of toner images corresponding to the respective colors. Four image stations Pa, Pb, Pc and Pd are formed, which correspond, respectively, to black, cyan, magenta and yellow.

In each of the image stations Pa, Pb, Pc and Pd, the drum cleaning device 14 removes and recovers toner remaining on a surface of the photosensitive drum 13. Then, the charging unit 15 charges uniformly the surface of the photosensitive drum 13 to a predetermined potential. An optical scanner 11 causes the surface of the photosensitive drum 13 to be exposed to light so as to form an electronic latent image on the surface. The development device 12 develops the electronic latent image on the surface of the photosensitive drum 13 so as to form the toner image on the surface of the photosensitive drum 13. Thus, each toner image of the corresponding color is formed on the surface of the corresponding photosensitive drum 13.

Subsequently, a belt cleaning device 25 removes and recovers remaining toner on an intermediate transfer belt 21 while the intermediate transfer belt 21 circumferentially moves in a direction indicated by an arrow C. Then, the toner image of each color on the surface of the corresponding photosensitive drum 13 is sequentially transferred to the intermediate transfer belt 21 and superimposed, and thus, a color toner image is formed on the intermediate transfer belt 21.

A nip region is formed between the intermediate transfer belt 21 and a transfer roller 26*a* of a secondary transfer device 26. While the recording sheet transported through a sheet transport path R1 is transported with being held in the nip region, the color toner image on the surface of the intermediate transfer belt 21 is transferred to the recording sheet. Then the recording sheet is held between a heat roller 31 of a fixing device 17 and a pressure roller 32 so that heat and pressure is applied to the recording sheet. Thus, the color toner image on the recording sheet is fixed.

The recording sheet is drawn out of the sheet feed cassette 5 by a pair of pickup rollers 33. The recording sheet is transported through the sheet transport path R1, and passes through the secondary transfer device 26 and the fixing device 17 so as to be discharged to a discharge tray 39 via a pair of discharge rollers 36. The sheet transport path R1 is provided with: a pair of registration rollers 34 that once stops the recording sheet so as to adjust the leading edge of the recording sheet and that starts the transportation of the recording sheet according to the timing to transfer the color toner image in the nip region between the intermediate transfer belt 21 and the transfer roller 26*a*; a pair of transport rollers 35 that transports the recording sheet; and the pair of discharge roller 36.

Furthermore, when an image is formed not only on the surface of a recording sheet but also on its back face, the recording sheet is transported in the reverse direction from the discharge roller pair 36 to a reverse path Rr so that the surface and the back face of the recording sheet are inverted. Then, the recording sheet is guided again to the registration roller pair 34. As in the case of the surface of the recording sheet, an image is recorded and fixed on the back face of the recording sheet, and the recording sheet is discharged to the discharge tray 39.

Figure 2:
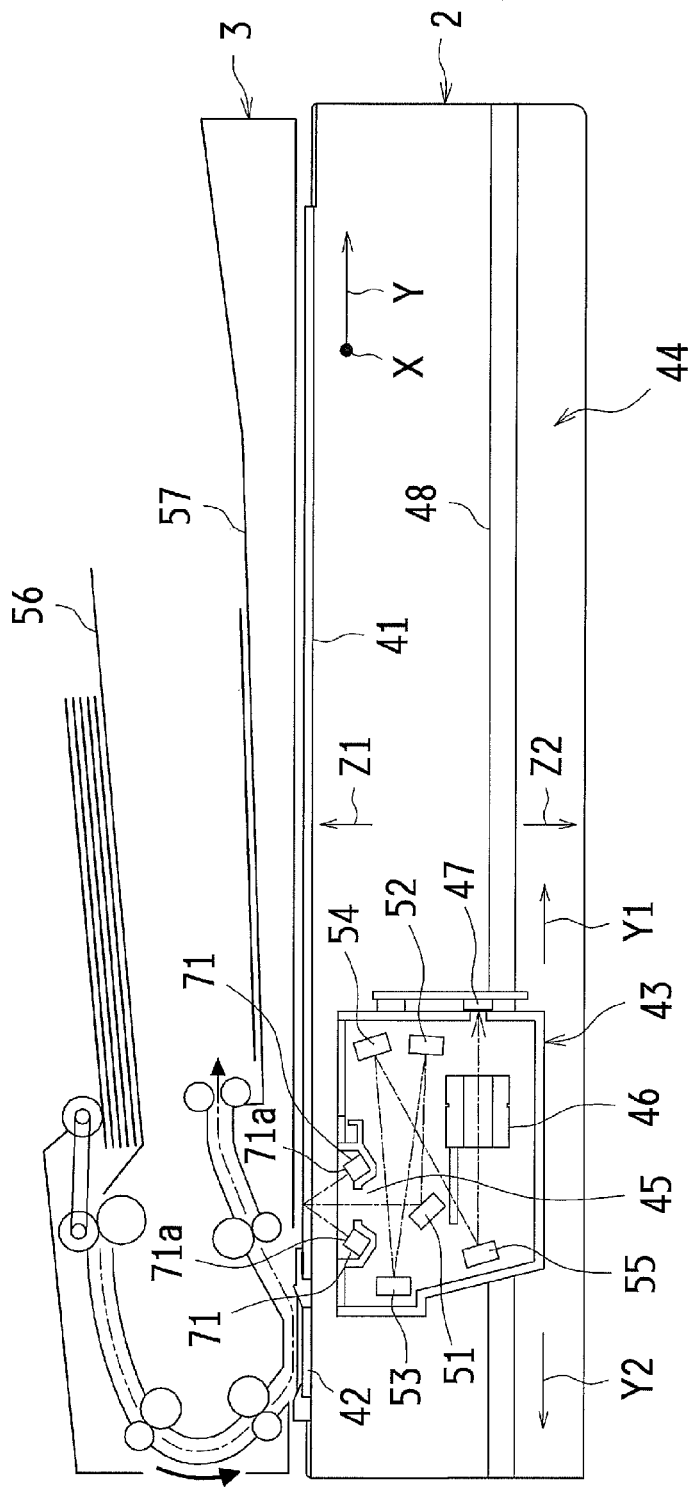
FIG. 2 is a cross-sectional view showing the image reading apparatus and an original transport apparatus of FIG. 1.

Next, description will be given on the image reading apparatus 2 of the first embodiment. FIG. 2 is a cross-sectional view showing the image reading apparatus 2 and the original transport apparatus 3.

In FIG. 2, in the original transport apparatus 3, a back side thereof is axially supported by a corresponding side of the image reading apparatus 2 disposed below using a hinge (not shown). Thus, the original transport apparatus 3 can be opened and closed by moving up and down a front side thereof. When the original transport apparatus 3 is opened, an original placement glass 41 of the image reading apparatus 2 is exposed.

The image reading apparatus 2 includes, for example, the original placement glass 41, an original reading glass 42, a scanning unit 43 and a moving unit 44. The moving unit 44 includes a guide shaft 48 that guides the scanning unit 43 in the sub-scanning direction Y and a drive portion (not shown) that moves the scanning unit 43 in the sub-scanning direction Y to position the scanning unit 43.

The scanning unit 43 includes, for example, an illuminating device 45, an imaging lens 46, a CCD (Charge Coupled Device) 47 and first-fifth reflecting mirrors 51-55. The scanning unit 43 is moved below either the original placement glass 41 or the original reading glass 42 by the moving unit 44 to read an original (irradiated object) placed on the original placement glass 41 (first read mode) or an original (irradiated object) transported on the original reading glass 42 (second read mode).

In the first read mode, the scanning unit 43 is moved below the original placement glass 41 by the moving unit 44. The original transport apparatus 3 is opened to place an original on the original placement glass 41, and after that, the original transport apparatus 3 is closed. While the scanning unit 43 is moved, by the moving unit 44, at a constant speed by a distance corresponding to the size of the original in the sub-scanning direction Y, the original on the original placement glass 41 is illuminated by the illuminating device 45. Then, the reflected light is sequentially reflected by the first-fifth reflecting mirrors 51-55 and guided to the imaging lens 46. The reflected light from the original is collected to the CCD 47 by the imaging lens 46 to form an image on the surface of the original on the CCD 47. The CCD 47 repeatedly scans the image on the surface of the original in the main-scanning direction X to read the image on the surface of the original.

In the second read mode, the scanning unit 43 is moved below the original reading glass 42 and positioned by the moving unit 44. The original is drawn out of an original placement tray 56 by the original transport apparatus 3, and is transported, on the original reading glass 42, in the sub-scanning direction Y so as to be discharged to a discharge tray 57. When the original passes on the original reading glass 42, the surface of the original is illuminated by the illuminating device 45 of the scanning unit 43 through the original reading glass 42. The reflected light from the surface of the original is sequentially reflected by the first-fifth reflecting mirrors 51-55 of the scanning unit 43 and guided to the imaging lens 46. The reflected light from the surface of the original is collected to the CCD 47 by the imaging lens 46 to form the image on the surface of the original on the CCD 47. The CCD 47 repeatedly scans the image on the surface of the original in the main-scanning direction X to read the image on the surface of the original.

Figure 3:
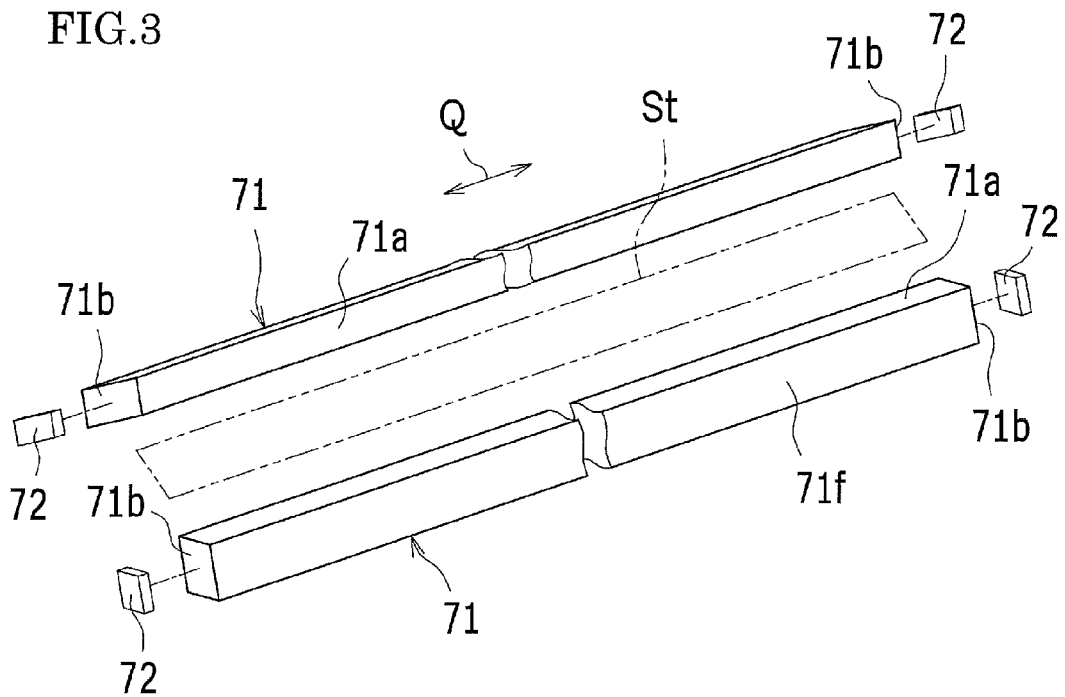
FIG. 3 is a perspective view showing light guiding bodies and LEDs extracted from an illuminating device of a scanning unit included in the image reading apparatus of FIG. 2, viewed from above.
Figure 4:
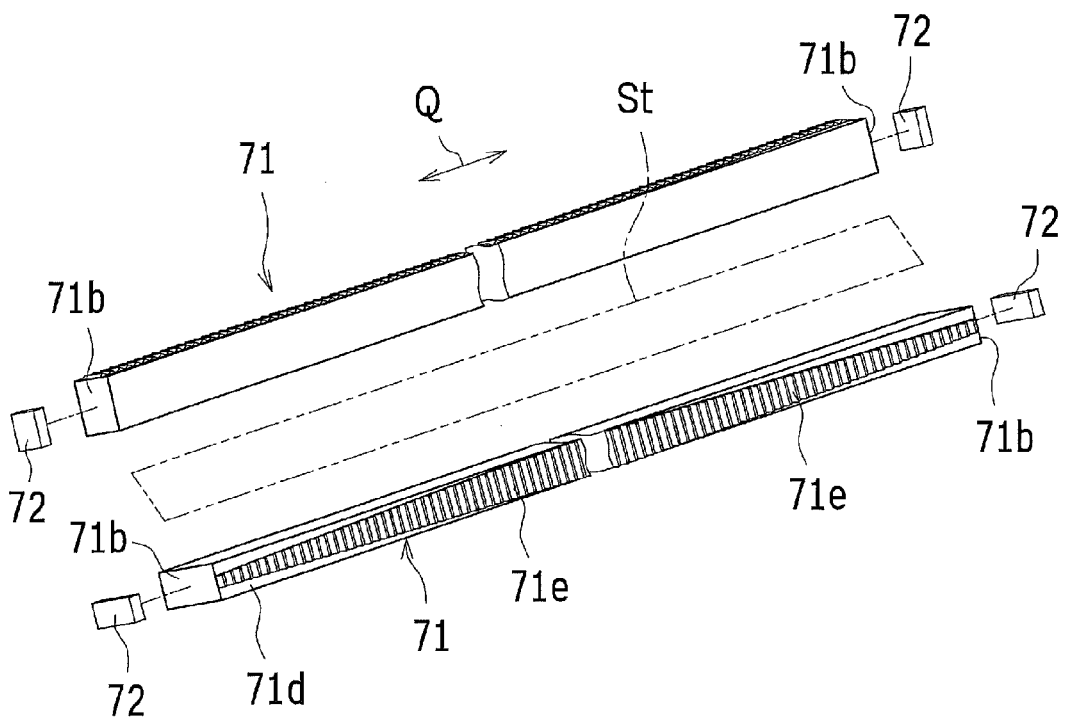
FIG. 4 is a perspective view showing the light guiding bodies and LEDs extracted from the illuminating device of FIG. 3, viewed from below.

Next, description will be given on the illuminating device 45 of the scanning unit 43. FIG. 3 is a perspective view of the schematic configuration of the illuminating device 45 viewed from above. FIG. 4 is a perspective view of the schematic configuration of the illuminating device 45 viewed from below. As shown in FIGS. 3 and 4, in the illuminating device 45, respective light guiding bodies 71 are disposed on both sides of a slit St that extends in the main-scanning direction X. On light incident surfaces 71b of both ends of each light guiding body 71, respective LEDs (light emitting devices) 72 are disposed. Instead of the LED, for example, another type of semiconductor element or a light bulb may be used.

The translucent light guiding body 71, which has a shape of a quadrangular prism, is made of a long translucent body. The light incident surfaces 71b are formed at both ends of the translucent body in the longitudinal direction Q thereof. A light emitting surface 71a is formed on one side surface of the translucent body along the longitudinal direction Q. A light emitting quantity adjusting portion 71e, which is opposite to the light emitting surface 71a, is formed on the other side surface of the translucent body along the longitudinal direction Q. On the other side surface also, a light reflecting surface 71d is formed in a region where the light emitting quantity adjusting portion 71e is not formed. The light guiding body 71 is made of acrylic resin formed by a mold.

Figure 5:
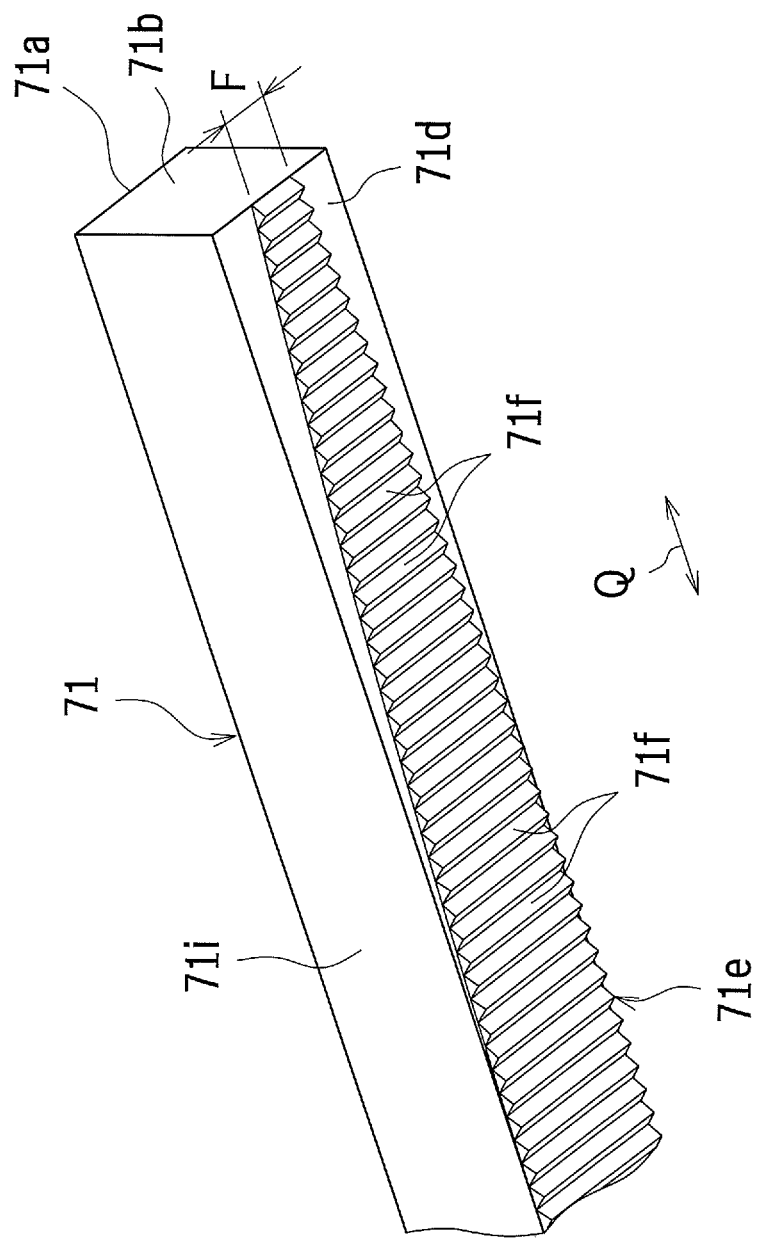
FIG. 5 is an enlarged perspective view showing the light guiding body included in the illuminating device.

As enlargedly shown in FIG. 5, the light reflecting surface 71d is a flat surface. Furthermore, the light emitting quantity adjusting portion 71e with a sawtooth-shaped longitudinal section has a number of inclined surfaces 71f that form the sawtooth-shaped longitudinal section.

In the above configuration of the illuminating device 45, the LEDs 72 face the respective light incident surfaces 71b at both ends of the light guiding body 71. Thus, light emitted from each LED 72 is incident to the corresponding light incident surface 71b of the light guiding body 71 and guided in the light guiding body 71 to be directly emitted from the light emitting surface 71a, or to be reflected by the light reflecting surface 71d or the light emitting quantity adjusting portion 71e and emitted from the light emitting surface 71a. At this time, the sawtooth-shaped light emitting quantity adjusting portion 71e diffusely reflects the light that is guided in the light guiding body 71 and is incident to the light emitting quantity adjusting portion 71e so that the light is emitted from the light emitting surface 71a.

The light emitting surfaces 71a of the respective light guiding bodies 71 face the same portion of the original through the original placement glass 41 or the original reading glass 42. Each light emitted from the corresponding light emitting surface 71a of the light guiding body 71 is incident to the same portion of the original to illuminate the portion. The reflected light reflected by the portion of the original is guided inside the scanning unit 43 through the slit St, and sequentially reflected by the first-fifth reflecting mirrors 51-55 to be incident to the CCD 47 via the imaging lens 46. Thus, the CCD 47 reads the image on the surface of the original (see FIG. 6 described later).

In the illuminating device 45, the LEDs 72 are disposed in the vicinity of the respective light incident surfaces 71b at both ends of the light guiding body 71. Since the light guiding body 71 is made of acrylic resin, the light guiding body 71 may be heated and deformed by heat generation of the LEDs 72. Also, in the image reading apparatus 2, an original read speed is increased and a light quantity to illuminate the original is increased. Thus, heat generation of the LED 72 is increased and the lifetime thereof tends to be shortened.

In view of the above, in the first embodiment, both ends of the light guiding body 71 protrude outside the casing of the scanning unit 43 from both sidewalls of the casing (see FIG. 7 described later). Therefore, both ends of the light guiding body 71 and the respective LEDs 72 are disposed outside the casing of the scanning unit 43. Thus, heat dissipation efficiency of both ends of the light guiding body 71 and the respective LEDs 72 is improved.

Figure 6:
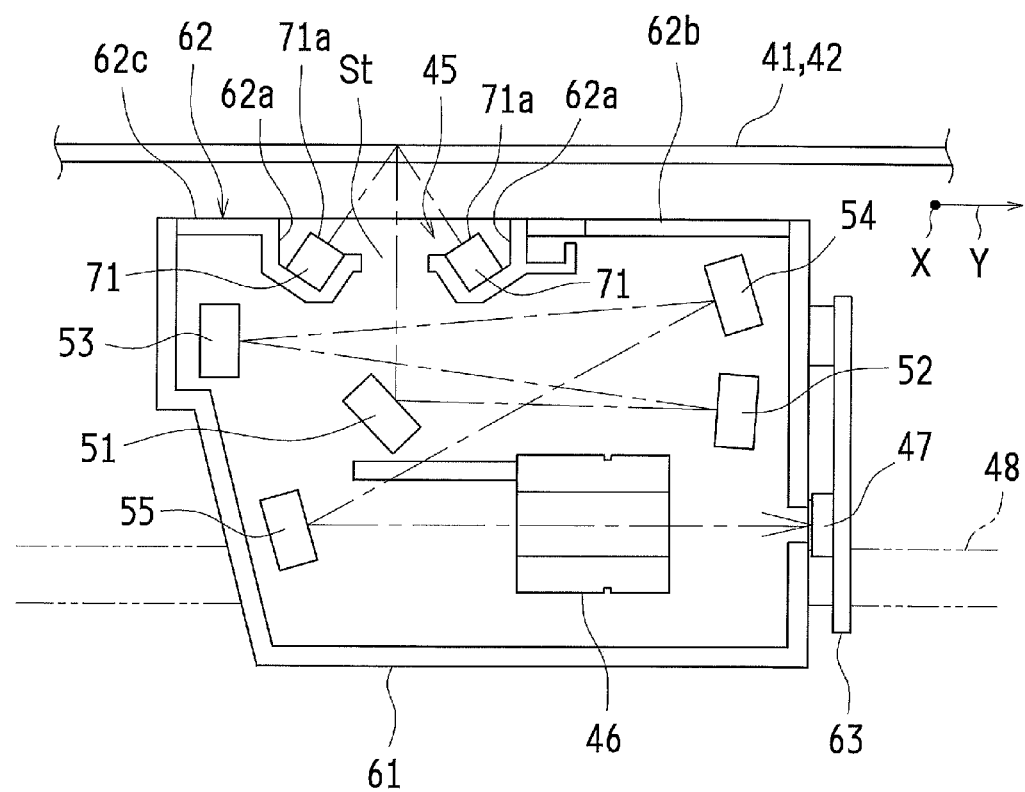
FIG. 6 is an enlarged cross-sectional view showing the scanning unit.

Next, description will be given in more details on the configuration of the scanning unit 43 and the illuminating device 45. FIG. 6 is an enlarged cross-sectional view of the scanning unit 43. FIG. 7 is a perspective view of the scanning unit 43. FIG. 8 is an enlarged perspective view showing an end portion of the scanning unit 43.

Figure 7:
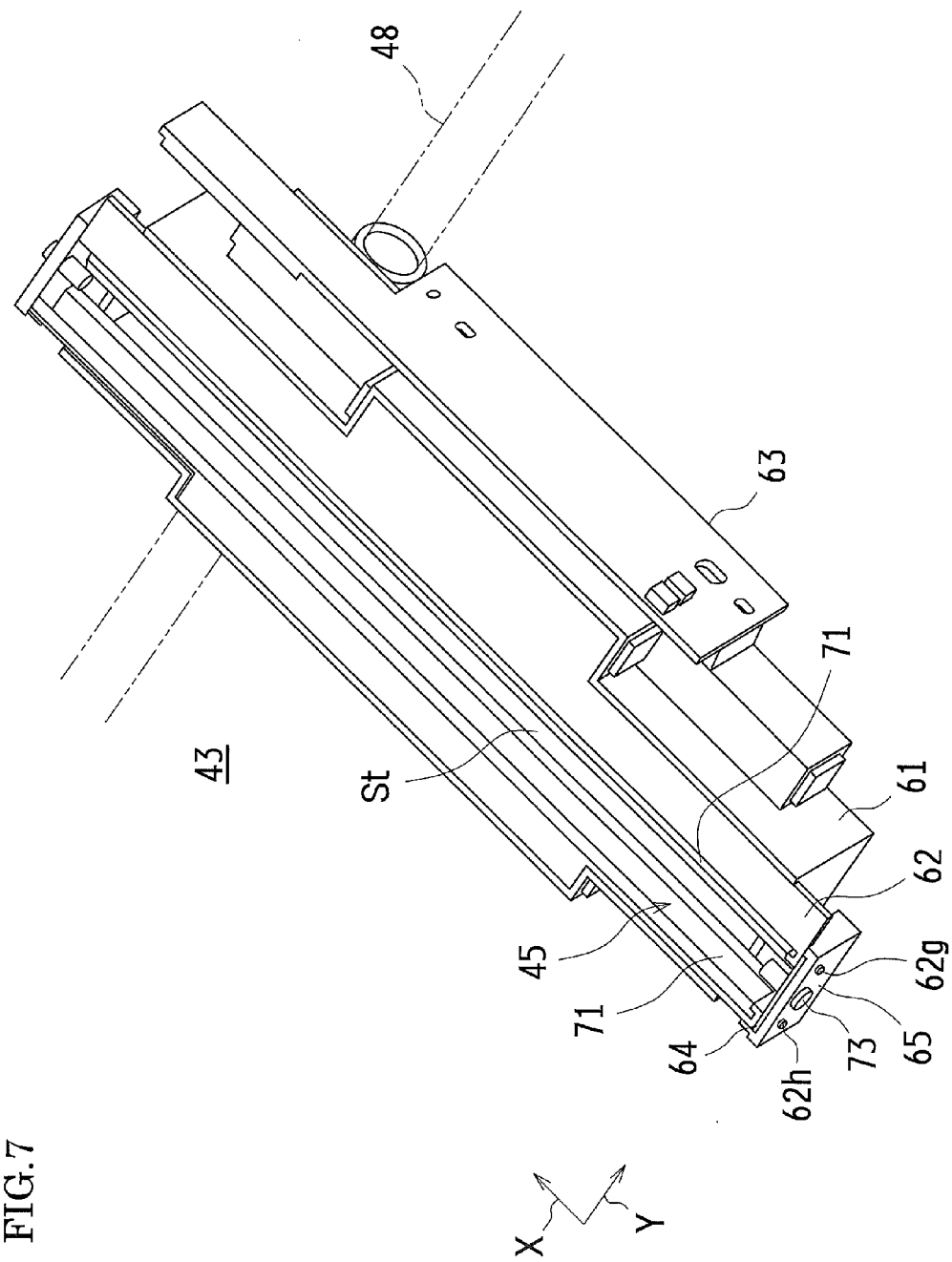
FIG. 7 is a perspective view of the scanning unit.
Figure 8:
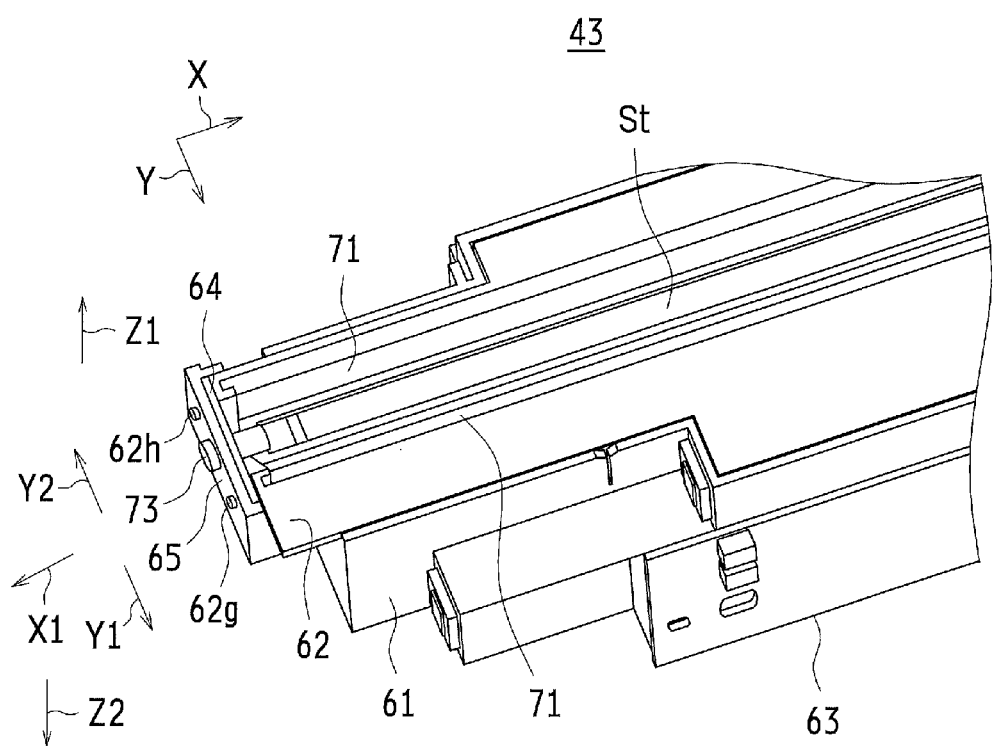
FIG. 8 is an enlarged perspective view showing an end portion of the scanning unit.

As shown in FIGS. 6-8, the scanning unit 43 includes a casing 61 having an opening in an upper portion thereof, a cover-like holding member 62 provided in the opening in the upper portion of the casing 61, the illuminating device 45 provided on the cover-like holding member 62 and a CCD substrate 63 provided on the sidewall of the casing 61 along the longitudinal direction (main-scanning direction X) of the casing 61.

In the casing 61, the imaging lens 46 and the first-fifth reflecting mirrors 51-55 are provided. The cover-like holding member 62 substantially covers the upper opening of the casing 61 and holds the illuminating device 45. Furthermore, the CCD 47 is mounted on the CCD substrate 63. A light receiving surface of the CCD 47 faces the inside of the casing 61 through a slit (not shown) formed on the sidewall of the casing 61.

The cover-like holding member 62 is provided with: two fitting grooves 62a that extend in the main-scanning direction X; and the slit St between the respective fitting grooves 62a. The light guiding bodies 71 are fitted in the respective fitting grooves 62a. As shown in FIGS. 3 and 4, in the illuminating device 45, the light emitted from each LED 72 is incident to the corresponding light incident surface 71b of the light guiding body 71. The light is emitted from each light emitting surface 71a of the corresponding light guiding body 71 so that the original is irradiated with the light through the original placement glass 41 or the original reading glass 42. The light reflected by the original penetrates the original placement glass 41 or the original reading glass 42 so as to be guided in the casing 61 through the slit St of the cover-like holding member 62, then is reflected sequentially by the first-fifth reflecting mirrors 51-55, and is incident to the CCD 47 via the imaging lens 46.

The illuminating device 45 includes, apart from the two light guiding bodies 71 and the four LEDs 72, two LED substrates 64 each having two LEDs 72 mounted thereon, and two heat dissipation plates 65 provided so as to overlap with respective outer surfaces of the LED substrates 64 (see FIG. 3, and FIG. 9 described later).

Figure 9:
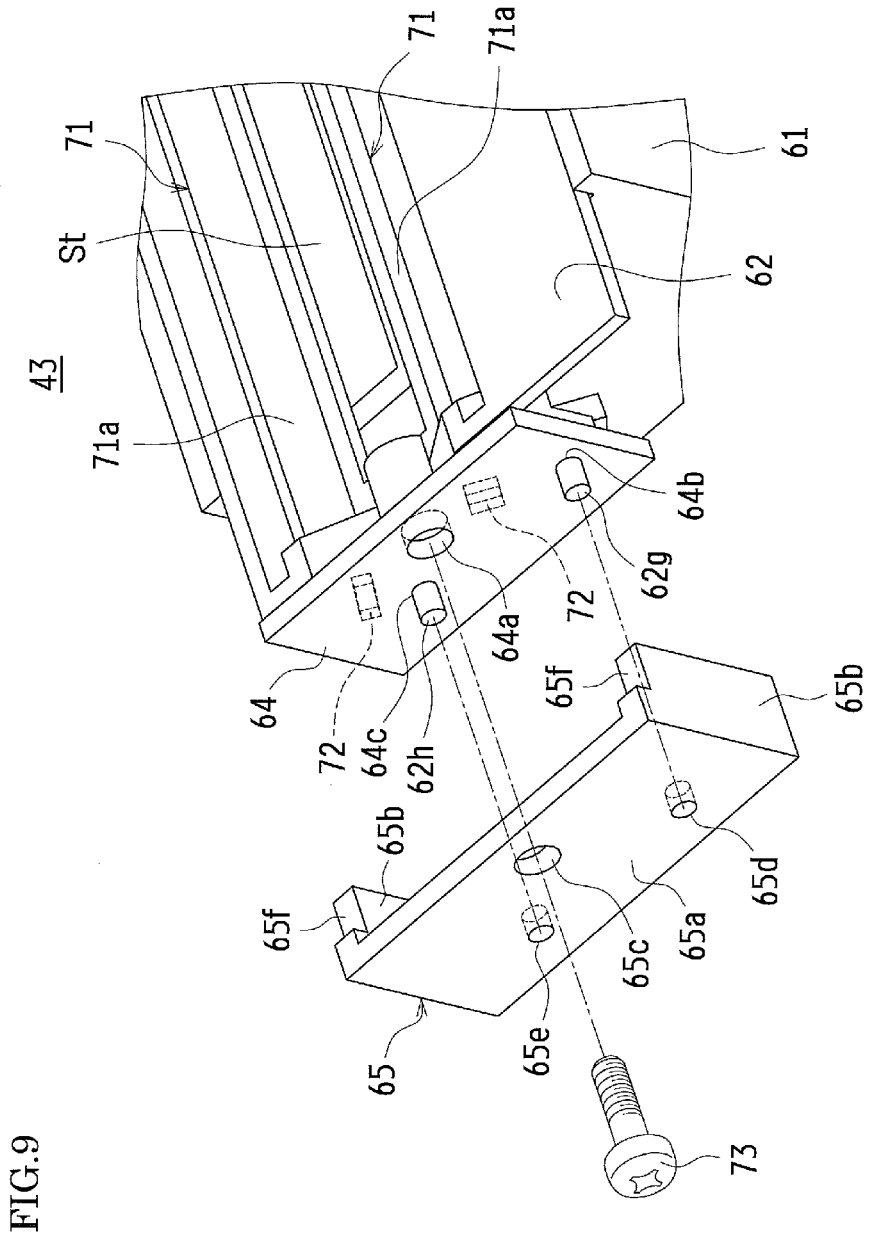
FIG. 9 is an enlarged perspective view showing a scanning unit in a state in which an LED substrate is exposed with a heat dissipation plate being removed.
Figure 10:
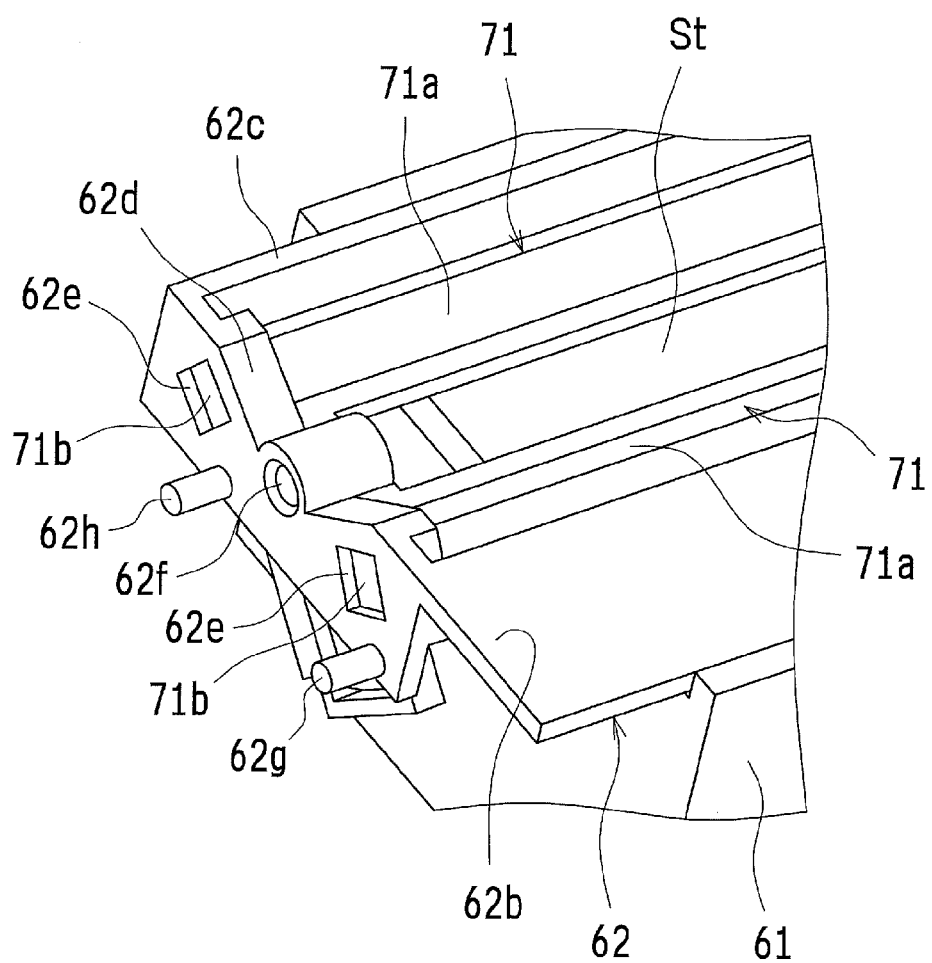
FIG. 10 is an enlarged perspective view showing a scanning unit in a state in which an end of a cover-like holding member is exposed with the LED substrate and the heat dissipation plate being removed.
Figure 11A:
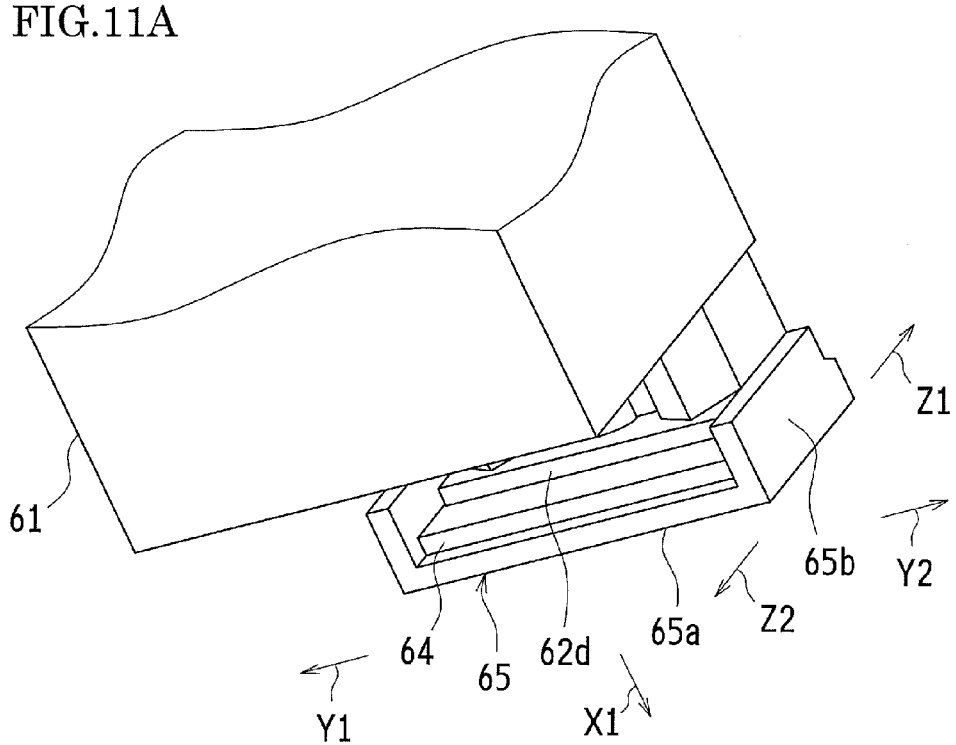
FIG. 11A is a perspective view showing the LED substrate and the heat dissipation plate being mounted on the end of the cover-like holding member, viewed from below.
Figure 11B:
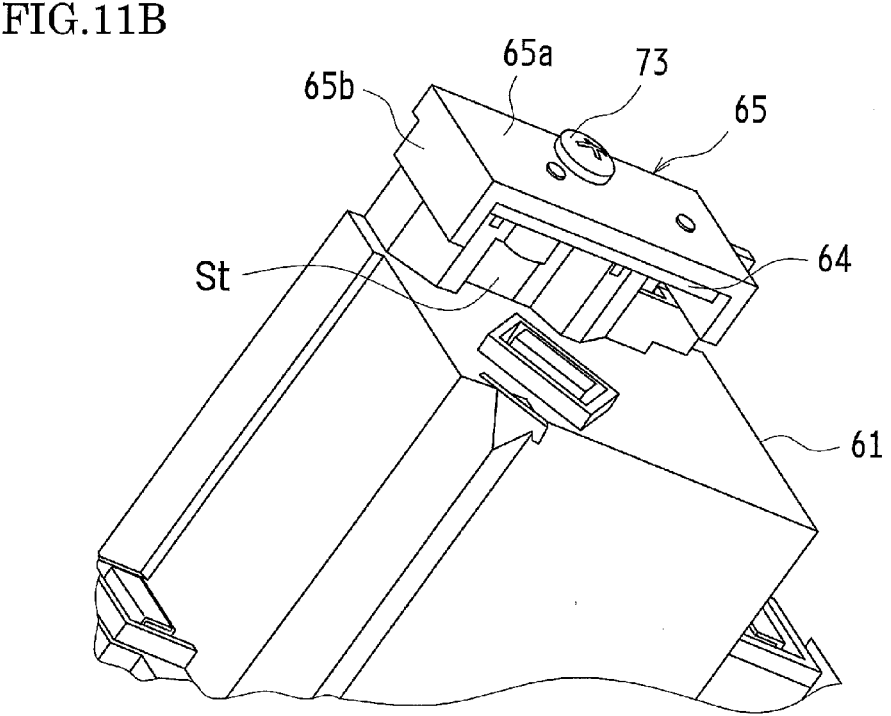
FIG. 11B is a perspective view showing the state shown in FIG. 11A viewed from below, from another angle.

FIG. 9 is an enlarged perspective view showing a state in which the LED substrate 64 is exposed with the heat dissipation plate 65 being removed. FIG. 10 is an enlarged perspective view showing a state in which an end of the cover-like holding member 62 is exposed with the LED substrate 64 and the heat dissipation plate 65 being removed. FIGS. 11A and 11B is a perspective view of the LED substrate 64 and the heat dissipation plate 65 being mounted on the end of the cover-like holding member 62, viewed from below.

As shown in FIGS. 9, 10, 11A and 11B, the cover-like holding member 62 includes shielding portions 62b and 62c that cover, except for the slit St, the upper opening of the casing 61, and a connecting portion 62d that are connected to respective ends of the shielding portions 62b and 62c. In each of the shielding portions 62b and 62c, the fitting groove 62a (shown in FIG. 6) is formed in which the corresponding light guiding body 71 is fitted.

Also, in the connecting portion 62d of the cover-like holding member 62, two through holes 62e that communicate with the respective fitting grooves 62a are formed. Each light incident surface 71b of the two light guiding bodies 71 is disposed in the corresponding through hole 62e (see FIG. 10). Furthermore, the light emitting surfaces 71a of the respective light guiding bodies 71 that face the original placement glass 41 or the original reading glass 42 are exposed. The three side surfaces other than the light emitting surface 71a of the light guiding body 71 are disposed inside the fitting groove 62a (see FIG. 6).

The connecting portion 62d of the cover-like holding member 62 is provided with: a screw hole 62f located in the center of the connecting portion 62d; and two pins 62g and 62h located on both sides of the screw hole 62f. The LED substrate 64, which is made of metal (e.g. aluminum), includes one mounting hole 64a and two positioning holes 64b and 64c located on both sides of the mounting hole 64a. Two LEDs 72 are mounted on one surface of the LED substrate 64. The heat dissipation plate 65, which is made of metal (e.g. aluminum), includes a main plate 65a and two side plates 65b bent at both ends of the main plate 65a. The main plate 65a includes one mounting hole 65c and two positioning holes 65d and 65e located on both sides of the mounting hole 65c. Also, on an upper side of each side plate 65b, a cutout portion 65f is formed.

Here, the pins 62g and 62h protruded from the connecting portion 62d of the cover-like holding member 62 are inserted respectively into the positioning holes 64b and 64c of the LED substrate 64. Thus, the LED substrate 64 is overlapped with the connecting portion 62d, and the LED substrate 64 is positioned relative to the connecting portion 62d. Accordingly, the mounting hole 64a of the LED substrate 64 is overlapped with the screw hole 62f of the connecting portion 62d (see FIG. 9). Also, the LEDs 72 on the LED substrate 64 are disposed in the respective through holes 62e of the connecting portion 62d, thus the light emitting surface of each LED 72 faces the corresponding light incident surface 71b of the light guiding body 71 inside the through hole 62e. Thus, light emitted from the light emitting surface of each LED 72 can be incident to the corresponding light incident surface 71b of the light guiding body 71.

Furthermore, the pins 62g and 62h protruded from the connecting portion 62d of the cover-like holding member 62 are inserted respectively into the positioning holes 65d and 65e of the main plate 65a of the heat dissipation plate 65. Thus, the main plate 65a of the heat dissipation plate 65 is overlapped with the LED substrate 64, and the main plate 65a of the heat dissipation plate 65 is positioned relative to the connecting portion 62d and the LED substrate 64. Accordingly, the mounting hole 65c of the main plate 65a of the heat dissipation plate 65 is overlapped with the mounting hole 64a of the LED substrate 64 and the screw hole 62f of the connecting portion 62d. In such a state, a screw 73 is inserted into the mounting hole 65c of the main plate 65a of the heat dissipation plate 65 and the mounting hole 64a of the LED substrate 64 so as to be screwed and tightened into the screw hole 62f of the connecting portion 62d. Thus, the heat dissipation plate 65 and the LED substrate 64 are fixed to the connecting portion 62d. The heat dissipation plates 65 and the LED substrates 64 are fixed to the respective connecting portions 62d at both ends of the cover-like holding member 62. Thus, the LEDs 72 are disposed so as to face the respective light incident surfaces 71b at both ends of the respective light guiding bodies 71.

In the above configuration of the illuminating device 45, as can be seen from FIGS. 6-10, 11A and 11B, both ends of the shielding portions 62b and 62c of the cover-like holding member 62 protrude outside the casing 61 of the scanning unit 43 from both sidewalls of the casing 61. Also, the connecting portions 62d provided at the respective ends of the shielding portions 62b and 62c protrude outside the casing 61. Furthermore, the slit St between the shielding portions 62b and 62c extends from both sidewalls of the casing 61 to the outside of the casing 61.

The light guiding bodies 71 are fitted in and held by the respective fitting grooves 62a of the shielding portions 62b and 62c of the cover-like holding member 62. Both ends of each light guiding body 71 extend to the respective connecting portions 62d on both sides of the cover-like holding member 62. In each connecting portion 62b, the light incident surfaces 71b of the respective light guiding bodies 71 are each disposed in the corresponding through hole 62e. The LED substrate 64 and the heat dissipation plate 65 are mounted on the connecting portion 62b, and the LEDs 72 on the LED substrate 64 are disposed in the respective through holes 62e of the connecting portion 62d. Therefore, both ends of each of the two light guiding bodies 71, the LEDs 72, the two LED substrates 64 and the two heat dissipation plates 65 are disposed outside the casing 61.

When the LEDs 72 on the LED substrate 64 generate heat, the heat of the LEDs 72 is conducted to the heat dissipation plate 65 through the LED substrate 64. Thus, the heat of the heat dissipation plate 65 is dissipated by air convection. Since the heat dissipation plate 65 is disposed outside the casing 61, the air is convected around the heat dissipation plate 65 without stagnation. Therefore, the heat dissipation plate 65 realizes high heat dissipation efficiency and furthermore a temperature rise of each LED 72 is suppressed, which results in suppression of the temperature rise of each end of the light guiding body 71. Apart from the heat dissipation plates 65, the ends of the light guiding bodies 71, the LED substrates 64, and the LEDs 72 are also disposed outside the casing 61. Thus, the heat hardly stays in the vicinity of the ends of the light guiding bodies 71, the LED substrates 64 and the LEDs 72. Therefore, the heat dissipation efficiency of the above respective members is improved, which also results in suppression of the temperature rises of the LEDs 72 and the ends of the light guiding bodies 71.

More specifically, the heat dissipation plate 65 is disposed outside of the casing 61, and thus, as shown in FIGS. 8 and 11A, the heat dissipation plate 65 is exposed in the vertical direction Z1 and Z2, the left and right direction (horizontal direction) Y1 and Y2, and the outward direction X1 of the heat dissipation plate 65. The vertical direction Z1 and Z2, the horizontal direction Y1 and Y2, and the outward direction X1 are perpendicular to each other. Also, as can be seen from FIG. 2, the image reading apparatus 2 has spaces in the vertical direction Z1 and Z2, and the horizontal direction Y1 and Y2 of the scanning unit 43. Furthermore, there is a space between each of the heat dissipation plates 65 provided on both sides of the casing 61 of the scanning unit 43 and each of both inner walls of the casing of the image reading apparatus 2. Therefore, the heat dissipation plates 65 on both sides of the scanning unit 43 have spaces in the vertical direction Z1 and Z2, the horizontal direction Y1 and Y2, and the outward direction X1.

For this reason, when the LEDs 72 generate heat and the temperature of the heat dissipation plate 65 rises, the air around the heat dissipation plate 65 is heated and rapidly convected. By such a rapid air convention, the heat of the heat dissipation plate 65 is efficiently dissipated.

Since the LED substrate 64 and the heat dissipation plate 65 are both made of aluminum, the heat of the LEDs 72 is smoothly conducted, through the LED substrate 64, to the heat dissipation plate 65 so as to be dissipated. Thus, the temperature rises of the LEDs 72 are suppressed. Furthermore, heat amount conducted by the LEDs 72 to the corresponding end of the light guiding body 71 is suppressed, which results in suppression of the temperature rises of the ends of the light guiding bodies 71.

As can be seen from FIGS. 11A and 11B, the connecting portion 62*d*, which is connected to the respective ends of the shielding portions 62*b* and 62*c* of the cover-like holding member 62, is separated apart from the sidewall of the casing 61. The slit St between the respective shielding portions 62*b* and 62*c* extends from the sidewall of the casing 61 to the outside of the casing 61. Thus, air convection is generated in the vertical direction between the connecting portion 62*d* and the sidewall of the casing 61 through the slit St. Since such an air convection in the vertical direction through the slit St is generated in the vicinity of the connecting portion 62*d*, the heat of the connecting portion 62*d* is efficiently dissipated. Thus, the heat of each LED 72 disposed in the corresponding through hole 62*e* of the connecting portion 62*d*, and the heat of the end of the light guiding body 71 hardly stay, which results in suppression of the temperature rises of the LEDs 72 and the ends of the light guiding bodies 71. Furthermore, the air convection in the vertical direction through the slit St dissipates the heat from one surface of the LED substrate 64 that faces the sidewall of the casing 61, i.e. from the surface of the LED substrate 64 on which the LEDs 72 are mounted. Thus, the temperature rises of the LEDs 72 are further suppressed, and also the temperature rises of the ends of the light guiding bodies 71 are further suppressed.

Also, as can be seen from FIGS. 11A and 11B, since the outer surfaces of the respective side plates 65*b* of the heat dissipation plate 65 are entirely exposed, the heat of the heat dissipation plate 65 is dissipated by air convection along the outer sides of the respective side plates 65*b*. Furthermore, the vertical width of the main plate 65*a* of the heat dissipation plate 65 is wider than the vertical width of the LED substrate 64, thus the upper and lower portions of the inner surface of the main plate 65*a* of the heat dissipation plate 65 are exposed and the inner surfaces of the respective side plates 65*b* of the heat dissipation plate 65 are almost exposed. Therefore, the heat of the heat dissipation plate 65 is more efficiently dissipated by the air convection in the vertical direction through the slit St.

In this way, in the first embodiment, both ends of each of the two light guiding bodies 71 protrude outward from the respective sidewalls of the casing 61, and the slit St of the cover-like holding member 62 extends outward. Accordingly, the LEDs 72, the two LED substrates 64 and the two heat dissipation plates 65 are separated apart from the respective sidewalls of the casing 61 to be disposed outside the casing 61. For this reason, air is convected without staying around the heat dissipation plates 65. Thus, the heat dissipation plates 65 realize high heat dissipation efficiency. Also, the temperature rises of the LEDs 72 are suppressed and the temperature rises of the ends of the light guiding bodies 71 are also suppressed. The heat hardly stays in the vicinity of the ends of the light guiding bodies 71, the LED substrates 64 and the LEDs 72. Therefore, the heat dissipation efficiency of the above respective members is improved, which also results in suppression of the temperature rises of the LEDs 72 and the ends of the light guiding bodies 71.

In the conventional art, a light emitting quantity from the light incident surface 71*b* of the light guiding body 71 is not uniform in the longitudinal direction Q of the light guiding body 71. The light emitting quantity tends to increase in the vicinity of both ends of the light guiding body 71 adjacent to the LEDs 72 compared to the region near the center of the light guiding body 71. Also, the peripheral light quantity is decreased by the cosine fourth law of the imaging lens 46 of the scanning unit 43. Therefore, the deviation of the light emitting quantity and the peripheral light quantity are compensated for each other, but not so satisfactorily. As a result, a received light quantity distribution received by the light receiving surface of the CCD 47 is uneven. For this reason, it is preferable to control an emitted light quantity distribution from the light incident surface 71*b* of the light guiding body 71 and uniform the received light quantity distribution received by the light receiving surface of the CCD 47.

However, it is not easy to adjust the emitted light quantity distribution from each light guiding body 71 by adjusting an inclination angle distribution of the inclined surfaces 71*f* that form the sawtooth-shaped longitudinal section of the light emitting quantity adjusting portion 71*e*, as conventionally carried out. A step occurs in variation of the emitted light quantity distribution regardless of how the inclination angle distribution is adjusted. Or, there is a case that an area of the light incident surface 71*b* of each end of the light guiding body 71 is enlarged and the number of the LEDs 72 is increased so as to adjust the emitted light quantity distribution by setting of positions of the LEDs 72. But in such a case, the number of components and the costs are increased.

Figure 12:
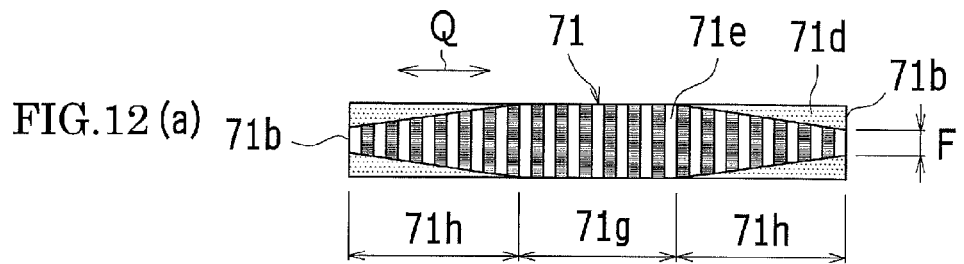
FIG. 12(a) is a plan view showing a light guiding body.
FIG. 12(b) is a side view showing the light guiding body.
FIG. 12(c) is a graph showing an emitted light quantity distribution from a light emitting surface of the light guiding body.
FIG. 12(d) is a graph showing a transmitted light quantity distribution of an imaging lens.
FIG. 12(e) is a graph showing a received light quantity distribution received by a light receiving surface of a CCD.
Figure 12:
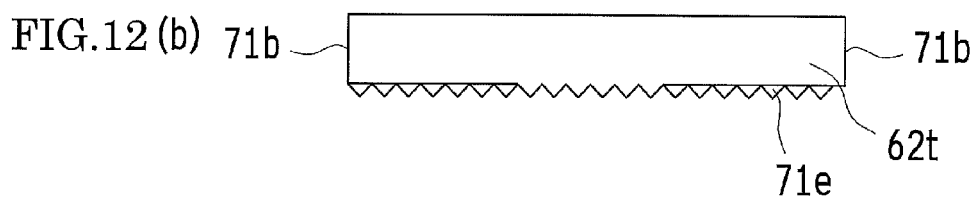
Figure 12:
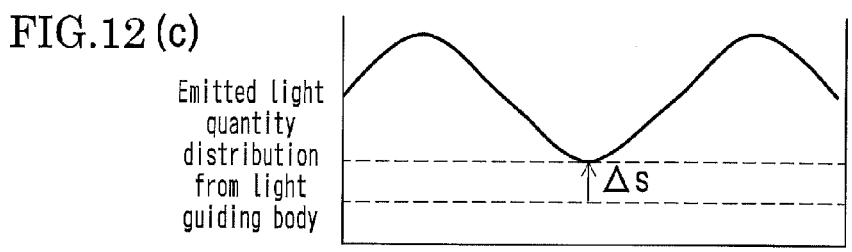
Figure 12:
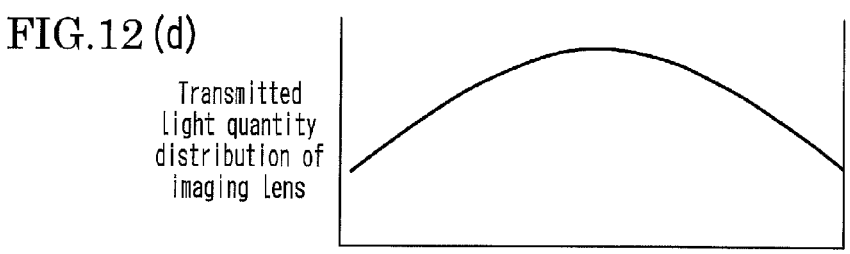
Figure 12:
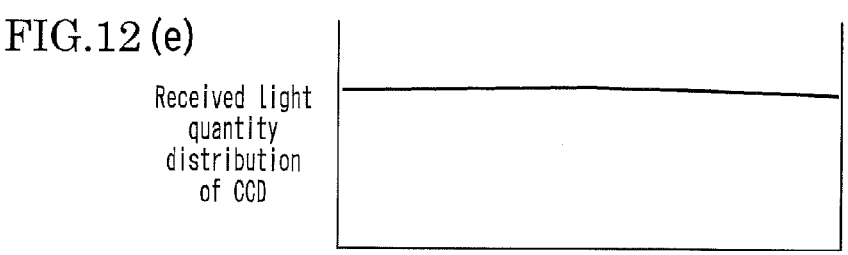

In the first embodiment, as shown in FIG. 12(*a*), a width F of the light emitting quantity adjusting portion 71*e* in the direction perpendicular to the longitudinal direction Q of the light guiding body 71 is gradually narrowed as the position in the width F becomes substantially closer to the light incident surface 71*b* of each end of the light guiding body 71. Specifically, in a central region 71*g* of the light guiding body 71, the width F of the light emitting quantity adjusting portion 71*e* in the direction perpendicular to the longitudinal direction Q of the light guiding body 71 is fixed to a constant value. In each side region 71*h* of the central region 71*g*, the width F of the light emitting quantity adjusting portion 71*e* is gradually narrowed as the position in the width F becomes closer to the light incident surface 71*b* of each end of the light guiding body 71.

Also, as shown in FIG. 12(*b*), the pitch, the height and the width (width of the inclined surface 71*f* in the longitudinal direction Q of the light guiding body 71) of each inclined surface 71*f* (shown in FIG. 5) are set to respective constant values. The inclined surfaces 71*f* form the sawtooth-shaped longitudinal section of the light emitting quantity adjusting portion 71*e*.

FIG. 12(*c*) shows the emitted light quantity distribution from the light emitting surface 71*a* of the light guiding body 71 to the original. In the emitted light quantity distribution, the light quantity tends to increase as the position becomes closer to each end of the light guiding body 71 and to decrease as the position becomes closer to the center of the light guiding body 71. Because the light of each LED 72 is incident to the corresponding light incident surface 71*b* of the end of the light guiding body 71, the light quantity inside the light guiding body 71 increases as the position becomes closer to each end of the light guiding body 71.

However, as shown in FIG. 12(*a*), in the central region 71*g* of the light guiding body 71, the width F of the light emitting quantity adjusting portion 71*e* is maintained so as to have a constant value, a light reflecting quantity of the light emitting quantity adjusting portion 71*e* is maintained without decrease, and the light emitting quantity from the light emitting surface 71*a* is also maintained without decrease. Also, in each side region 71*h* of the light guiding body 71, the width F of the light emitting quantity adjusting portion 71*e* is gradually narrowed as the position in the width F becomes closer to the light incident surface 71*b* of each end of the light guiding body 71. Thus, the light reflecting quantity of the light emitting quantity adjusting portion 71e decreases as the position becomes closer to the light incident surface 71b of each end of the light guiding body 71, and the light emitting quantity from the light emitting surface 71a decreases. For this reason, in the emitted light quantity distribution shown in FIG. 12(c), a decreasing degree of the light emitting quantity in the vicinity of the center of the light guiding body 71 is corrected by Δs relative to the light emitting quantity in the vicinity of each end of the light guiding body 71. That is, the light emitting quantity in the vicinity of the center of the light guiding body 71 is raised by Δs.

The emitted light quantity distribution from the light guiding body 71 is equivalent to an irradiated light quantity distribution to the surface of the original. In the first embodiment, the width of the light reflecting surface 71d is varied according to the position in the light guiding body 71 in the longitudinal direction Q thereof. The light quantity reflected by the light reflecting surface 71d hardly affects the emitted light quantity distribution shown in FIG. 12(c).

FIG. 12(d) shows a transmitted light quantity distribution (limb darkening characteristics of the imaging lens 46) that transmits the imaging lens 46 to be incident to the light receiving surface of the CCD 47. In the transmitted light quantity distribution shown in FIG. 12(d), the light quantity decreases as the position becomes closer to each end of the imaging lens 46 and increases as the position becomes closer to the center of the imaging lens 46, by the cosine fourth law of the imaging lens 46.

Here, in the emitted light quantity distribution from the light emitting surface 71a of the light guiding body 71 as shown in FIG. 12(c), the light quantity tends to increase as the position becomes closer to the light incident surface 71b of each end of the light guiding body 71, and to decrease as the position becomes closer to the center of the light guiding body 71. Also, in the transmitted light quantity distribution that transmits the imaging lens 46 as shown in FIG. 12(d), the light quantity tends to decrease as the position becomes closer to each end of the imaging lens 46 and to increase as the position becomes closer to the center of the imaging lens 46. Thus, the deviation of the emitted light quantity distribution as shown in FIG. 12(c) and the deviation of the transmitted light quantity distribution as shown in FIG. 12(d) tend to be compensated for each other. Furthermore, the width F of the light emitting quantity adjusting portion 71e is enlarged in the vicinity of the center of the light guiding body 71 and gradually narrowed as the position in the width F becomes closer to the light incident surface 71b of each end of the light guiding body 71, thereby correcting the decreasing degree of the light emitting quantity in the vicinity of the center of the light guiding body 71 by Δs. Therefore, the deviation of the emitted light quantity distribution as shown in FIG. 12(c) and the deviation of the transmitted light quantity distribution as shown in FIG. 12(d) are satisfactorily compensated for each other. In the result, as shown in FIG. 12(e), the received light quantity distribution received by the light receiving surface of the CCD 47 becomes uniform.

Also, as can be seen from FIG. 12(c), the emitted light quantity distribution varies smoothly without causing a step. Thus, it is possible to satisfactorily compensate the decrease of the peripheral light quantity generated by the cosine fourth law of the imaging lens 46.

Next, description will be given on the image reading apparatus 2 of the second embodiment. Compared to the first embodiment, the second embodiment differs in use of a light guiding body 71A as shown in FIGS. 13(a) and 13(b) instead of the light guiding body 71 of the illuminating device 45.

Figure 13:
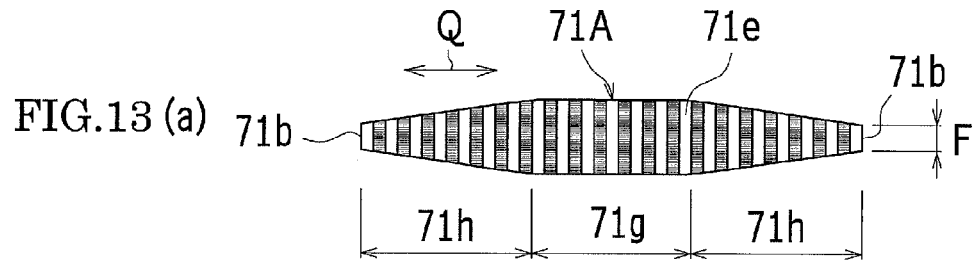
FIG. 13(a) is a plan view showing a light guiding body of a second embodiment.
FIG. 13(b) is a side view showing the light guiding body of the second embodiment.
FIG. 13(c) is a graph showing an emitted light quantity distribution from a light emitting surface of the light guiding body of the second embodiment.
FIG. 13(d) is a graph showing a transmitted light quantity distribution of an imaging lens.
FIG. 13(e) is a graph showing a received light quantity distribution received by a light receiving surface of a CCD.
Figure 13:
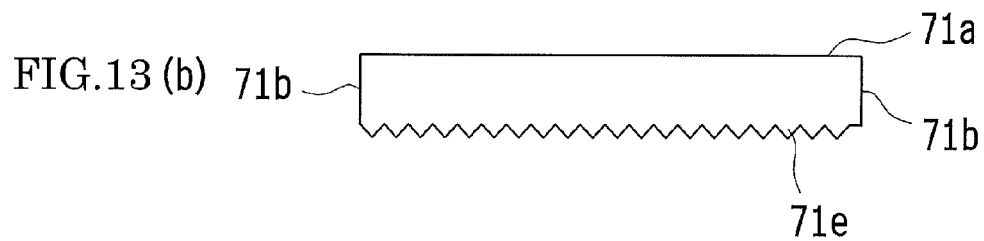

In the second embodiment, as shown in FIG. 13(a), a width of the light guiding body 71A in the direction perpendicular to the longitudinal direction Q of the light guiding body 71A is gradually narrowed as the position in the width becomes substantially closer to the light incident surface 71b of each end of the light guiding body 71A. Thus, the width of the light emitting surface 71a of the light guiding body 71A and the width F of the light emitting quantity adjusting portion 71e are coincident with the width of the light guiding body 71A. Accordingly, the light guiding body 71A does not have any surface corresponding to the light reflecting surface 71d of the light guiding body 71 in FIG. 12(a).

Specifically, in the central region 71g of the light guiding body 71A, the width of the light guiding body 71A, the width of the light emitting surface 71a and the width F of the light emitting quantity adjusting portion 71e in the direction perpendicular to the longitudinal direction Q of the light guiding body 71A are fixed to a constant value. In each side of the central region 71g, the width of the light guiding body 71A, the width of the light emitting surface 71a and the width F of the light emitting quantity adjusting portion 71e are gradually narrowed as respective positions of the above widths become closer to the light incident surface 71b of each end of the light guiding body 71A.

Also, as shown in FIG. 13(b), the pitch, the height and the width (width of the inclined surface 71f in the longitudinal direction Q of the light guiding body 71A) of each inclined surface 71f are set to respective constant values. The inclined surfaces 71f form the sawtooth-shaped longitudinal section of the light emitting quantity adjusting portion 71e.

The emitted light quantity distribution from the light guiding body 71A is as shown in FIG. 13(c). Similarly to the emitted light quantity distribution from the light guiding body 71 as shown in FIG. 12(c), the decreasing degree of the light emitting quantity in the vicinity of the center of the light guiding body 71A is reduced by Δs, thus the light emitting quantity in the vicinity of the center is raised by Δs.

Therefore, the deviation of the emitted light quantity distribution as shown in FIG. 13(c) and the deviation of the transmitted light quantity distribution as shown in FIG. 13(d) are satisfactorily compensated for each other. Thus, as shown in FIG. 13(e), the received light quantity distribution received by the light receiving surface of the CCD 47 becomes uniform.

Also, as can be seen from FIG. 13(c), the emitted light quantity distribution varies smoothly without causing a step. Thus, it is possible to satisfactorily compensate the decrease of the peripheral light quantity generated by the cosine fourth law of the imaging lens 46.

In the image reading apparatus 2 with the above-described light guiding body 71A, similarly to the first embodiment, two light guiding bodies 71A are fitted in the respective fitting grooves 62a of the cover-like holding member 62. The light from each LED 72 is incident to the corresponding light incident surface 71b of the light guiding body 71A. The light is emitted from each light emitting surface 71a of the corresponding light guiding body 71A so that the original is irradiated with the light through the original placement glass 41 or the original reading glass 42.

Also, similarly to the first embodiment, both ends of the cover-like holding member 62 protrude outside the casing 61 of the scanning unit 43 from both sidewalls of the casing 61. Thus, both ends of each light guiding body 71A protrude outside the casing 61. Therefore, heat dissipation efficiency of both ends of each light guiding body 71A, the respective LEDs 72 and the like is improved.

Next, description will be given on the image reading apparatus 2 of the third embodiment. Compared to the first embodiment, the third embodiment differs in use of a light guiding body 71B as shown in FIGS. 14(a) and 14(b) instead of the light guiding body 71 of the illuminating device 45.

Figure 14:
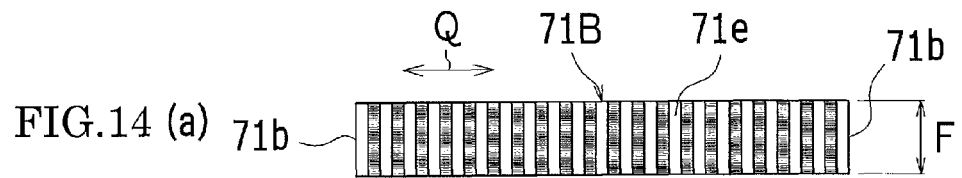
FIG. 14(a) is a plan view showing a light guiding body of a third embodiment.
FIG. 14(b) is a side view showing the light guiding body of the third embodiment.
FIG. 14(c) is a graph showing an emitted light quantity distribution from a light emitting surface of the light guiding body of the third embodiment.
FIG. 14(d) is a graph showing a transmitted light quantity distribution of an imaging lens.
FIG. 14(e) is a graph showing a received light quantity distribution received by a light receiving surface of a CCD.
Figure 14:
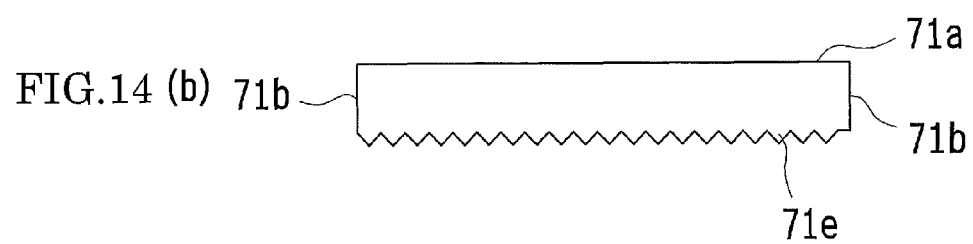
Figure 14:
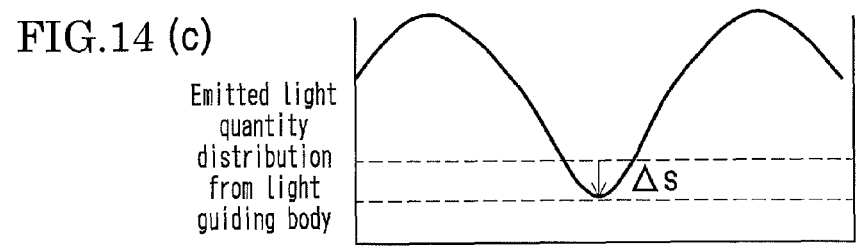
Figure 14:
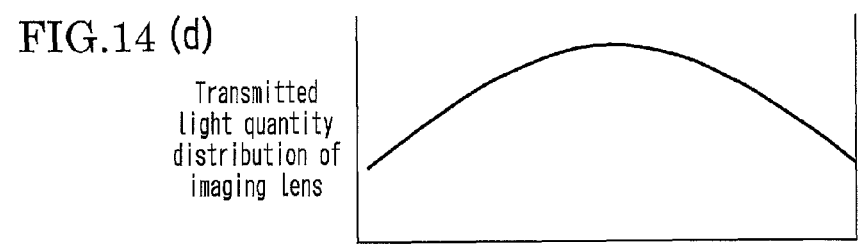
Figure 14:
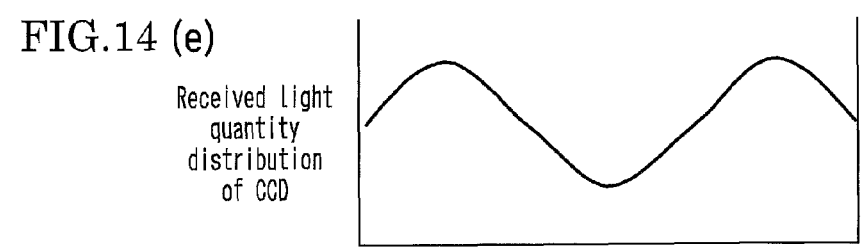

As shown in FIG. 14(a), in the light guiding body 71B, the width F of the light emitting quantity adjusting portion 71e in the direction perpendicular to the longitudinal direction Q of the light guiding body 71B is coincident with the fixed width of the light guiding body 71B. Accordingly, the light guiding body 71B does not have any surface corresponding to the light reflecting surface 71d of the light guiding body 71 in FIG. 5.

Also, as shown in FIG. 14(b), the pitch, the height and the width (width of the inclined surface 71f in the longitudinal direction Q of the light guiding body 71B) of each inclined surface 71f are set to respective constant values. The inclined surfaces 71f form the sawtooth-shaped longitudinal section of the light emitting quantity adjusting portion 71e.

In this case, the emitted light quantity distribution emitted from the light emitting surface 71a to the original is as shown in FIG. 14(c). In the light guiding body 71B of the third embodiment, the width F of the light emitting quantity adjusting portion 71e is fixed. Thus, when the light emitting quantity in the vicinity of the center of the light guiding body 71B is maintained without decrease, the light emitting quantity in the vicinity of each end of the light guiding body 71B does not decrease. Therefore, compared to the emitted light quantity distribution from the light guiding body 71 of the first embodiment as shown in FIG. 12(c), the light emitting quantity in the vicinity of the center of the light guiding body 71B is more decreased by Δs, thereby the decreasing degree of the light emitting quantity in the vicinity of the center is not reduced.

Therefore, the deviation of the emitted light quantity distribution of the light guiding body 71B as shown in FIG. 14(c) and the deviation of the transmitted light quantity distribution of the imaging lens 46 as shown in FIG. 14(d) are not satisfactorily compensated for each other. Thus, as shown in FIG. 14(e), the received light quantity distribution received by the light receiving surface of the CCD 47 does not become uniform and significantly decreases in the vicinity of the center of the light receiving surface. Thus, the decrease of the peripheral light quantity generated by the cosine fourth law of the imaging lens 46 is not compensated.

However, in the third embodiment, similarly to the first embodiment, two light guiding bodies 71B are used with being fitted in the respective fitting grooves 62a of the cover-like holding member 62. Furthermore, similarly to the first embodiment, both ends of the cover-like holding member 62 protrude outside the casing 61 of the scanning unit 43 from both sidewalls of the casing 61. Thus, both ends of each light guiding body 71B protrude outside the casing 61. Therefore, heat dissipation efficiency of both ends of each light guiding body 71B, the respective LEDs 72 and the like is improved.

Next, description will be given on the fourth to eleventh embodiments. In the fourth embodiment, the light emitting quantity adjusting portion 71e and two side surfaces 71i (shown in FIG. 5) of the light guiding body 71 in FIGS. 12(a) and 12(b) or of the light guiding body 71A in FIGS. 13(a) and 13(b) are disposed inside the fitting groove 62a (shown in FIG. 6) of the cover-like holding member 62. Thus, a plating or a white coating is applied to the inner wall of the fitting groove 62a. Or, a white sheet is adhered to the inner wall of the fitting groove 62a. Thereby light leaking from the light emitting quantity adjusting portion 71e and the respective side surfaces 71i to the outside of the light guiding body 71 or 71A can be reflected inside the fitting groove 62a to return inside the light guiding body 71 or 71A. Thus, it is possible to increase the light emitting quantity from the light emitting surface 71a.

In the fifth embodiment, the width F of the light emitting quantity adjusting portion 71e is coincident with the fixed width of the light guiding body 71B, as shown in FIG. 14(a). A surface treatment is partially applied individually to each of the inclined surfaces 71f of the light emitting quantity adjusting portion 71e, thereby the light reflecting quantity of each inclined surface 71f is adjusted so that the emitted light quantity distribution as shown in FIG. 12(c) or 13(c) is set. The partial surface treatment to the inclined surface 71f includes, for example, a white coating, a black coating and a chemical treatment. The white coating can increase the light reflecting quantity. The black coating can decrease the light reflecting quantity. The chemical treatment can adjust optical reflectance of the inclined surface 71f.

In the sixth embodiment, the light emitting quantity adjusting portion 71e of the light guiding body 71 or 71A of the first or second embodiment does not have the sawtooth-shaped longitudinal section, but has a wave-shaped longitudinal section or a longitudinal section in which a number of semicircles or semi-ellipses are continuously arranged.

In the seventh embodiment, one side surface in the longitudinal direction Q of the light guiding body, which is opposite to the light emitting surface 71a, is formed as a flat surface. Then, on the flat surface, a black or white stripe pattern is formed in the longitudinal direction Q of the light guiding body. The width of the stripe pattern in the direction perpendicular to the longitudinal direction Q of the light guiding body is varied by the position in the light guiding body in the longitudinal direction Q, thereby the light emitting quantity adjusting portion 71e is formed. For example, when the stripe pattern is the white stripe pattern, the light reflecting quantity of the light emitting quantity adjusting portion 71e increases as the width of the stripe pattern is enlarged, thus the light emitting quantity from the light emitting surface 71a increases. On the other hand, the light reflecting quantity of the light emitting quantity adjusting portion 71e decreases as the width of the stripe pattern is narrowed, thus the light emitting quantity from the light emitting surface 71a decreases. In this way, it is possible to set suitably the emitted light quantity distribution in the longitudinal direction Q of the light guiding body.

In the eighth embodiment, the width of the light emitting quantity adjusting portion 71e in the direction perpendicular to the longitudinal direction Q of the light guiding body is varied smoothly. In this case, as shown in FIGS. 12(a) and 14(a), when the light guiding body is viewed in plan view, both sides of the light emitting quantity adjusting portion 71e along the longitudinal direction Q are constituted of straight or smoothly curved lines. Thereby, it is possible to vary more smoothly the emitted light quantity distribution of the light guiding body in the longitudinal direction Q.

In the ninth embodiment, the width F of the light emitting quantity adjusting portion 71e of the light guiding body 71 is not gradually narrowed as the position in the width F becomes closer to the light incident surface 71b of each end of the light guiding body 71, but is set variously. For example, the width F of the light emitting quantity adjusting portion 71e is enlarged in the vicinity of each end of the light guiding body 71 and also in the vicinity of the center thereof, and furthermore, is narrowed in the remaining region. In this way, it is possible to set variously the emitted light quantity distribution of the light guiding body in the longitudinal direction Q.

In the tenth embodiment, the cross sectional shape of the light guiding body 71 or 71A of the first or second embodiment is set to a shape other than the rectangular shape. For example, the cross sectional shape thereof is a circle or an ellipse.

In the eleventh embodiment, the light guiding body 71 or 71A of the first or second embodiment does not have one LED 72 on each end thereof, that is, the number of the LEDs 72 on each end is increased. In this way, it is possible to increase the light emitting quantity from the light emitting surface 71a. Note that the first to eleventh embodiments may be suitably combined.

Figure 15:
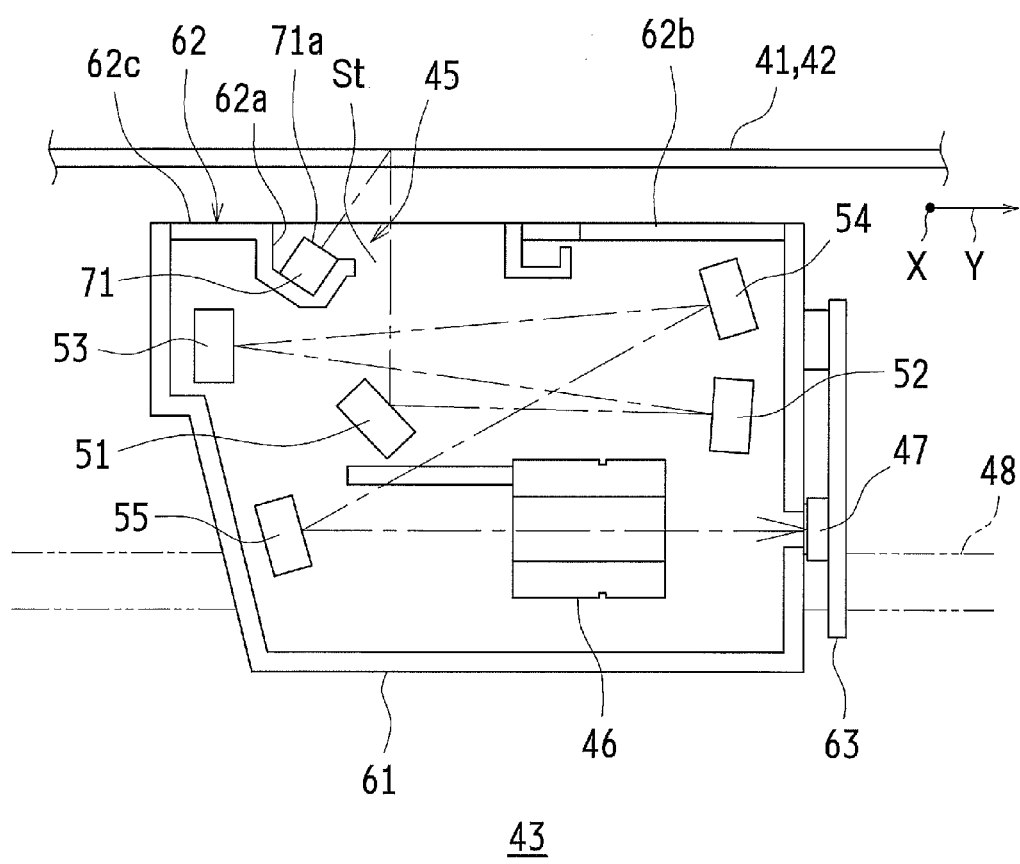
FIG. 15 is an enlarged cross-sectional view showing an image reading apparatus of a twelfth embodiment.

Next, description will be given on the image reading apparatus 2 of the twelfth embodiment. FIG. 15 is an enlarged cross-sectional view showing the image reading apparatus 2 of the twelfth embodiment. Compared to the first embodiment, the twelfth embodiment differs in use of a single light guiding body 71 of the illuminating device 45.

As shown in FIG. 15, the cover-like holding member 62 includes one fitting groove 62a in which one light guiding body 71 is fitted. Also, similarly to the first embodiment, both ends of the cover-like holding member 62 protrude outside the casing 61 of the scanning unit 43 from both sidewalls of the casing 61. Thus, both ends of the light guiding body 71 protrude outside the casing 61. Therefore, heat dissipation efficiency of both ends of the light guiding body 71, the respective LEDs 72 and the like is improved.

Also in the above configuration with one light guiding body 71, the light emitted from each LED 72 is incident to the corresponding light incident surface 71b of the light guiding body 71. The light is emitted from the light emitting surface 71a of the light guiding body 71, thus the original can be irradiated substantially uniformly with the light through the original placement glass 41 or the original reading glass 42.

Figure 16:
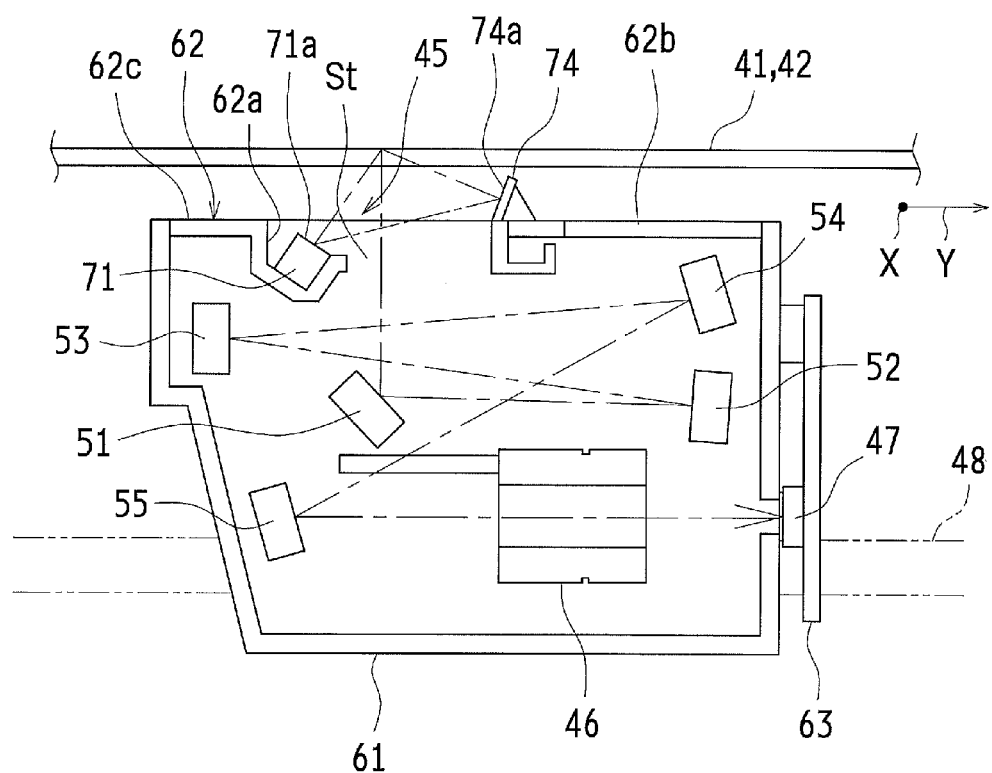
FIG. 16 is an enlarged cross-sectional view showing an image reading apparatus of a thirteenth embodiment.

Next, description will be given on the image reading apparatus 2 of the thirteenth embodiment. FIG. 16 is an enlarged cross-sectional view showing the image reading apparatus 2 of the thirteenth embodiment. Compared to the first embodiment, the thirteenth embodiment differs in use of one light guiding body 71 of the illuminating device 45, and in use of a mirror 74 that reflects the light emitted from the light emitting surface 71a of the light guiding body 71 so that the light is incident to the original.

As shown in FIG. 16, the cover-like holding member 62 includes: one fitting groove 62a in which one light guiding body 71 is fitted; and the mirror 74 that is inclined and supported on the side opposite to the light guiding body 71 relative to the slit St. Similarly to the first embodiment, both ends of the cover-like holding member 62 protrude outside the casing 61 of the scanning unit 43 from both sidewalls of the casing 61. Thus, both ends of the light guiding body 71 and both ends of the mirror 74 protrude outside the casing 61. Therefore, heat dissipation efficiency of both ends of the light guiding body 71, the respective LEDs 72 and the like is improved.

In the above configuration with the light guiding body 71 and the mirror 74, the light emitted from each LED 72 is incident to the corresponding light incident surface 71b of the light guiding body 71. The light is emitted from the light emitting surface 71a of the light guiding body 71, thus the original can be irradiated substantially uniformly with the light through the original placement glass 41 or the original reading glass 42. Also, the light emitted from the light emitting surface 71a of the light guiding body 71 is reflected by a reflecting surface 74a of the mirror 74, thereby the light can be incident to the original. Thus, the light emitted from the light emitting surface 71a of the light guiding body 71 can be efficiently used for illuminating the original. Note that the first to third embodiments, the twelfth embodiment and the thirteenth embodiment may be suitably combined.

Figure 17:
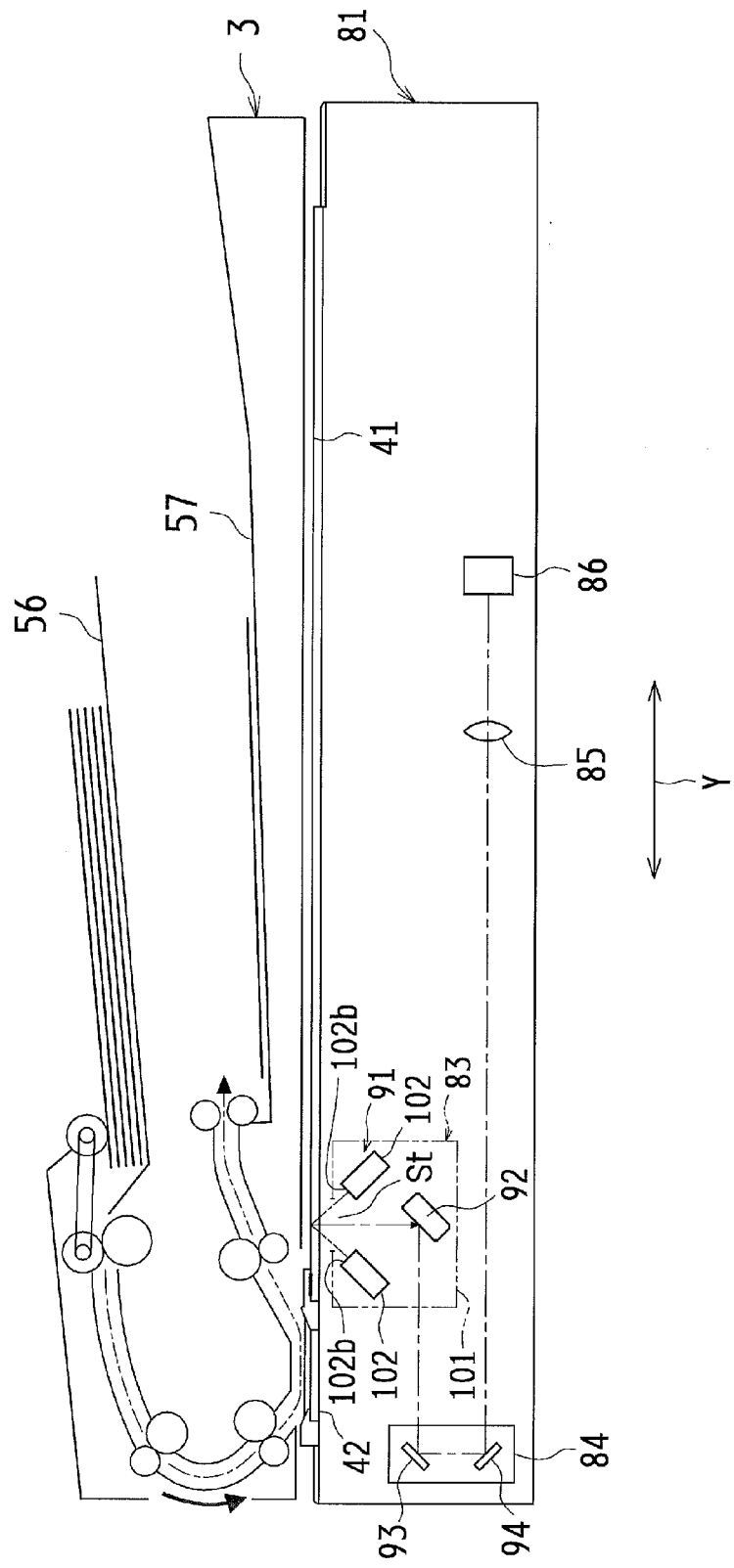
FIG. 17 is a cross-sectional view showing an image reading apparatus and an original transport apparatus of a fourteenth embodiment.

Next, description will be given on an image reading apparatus 81 of the fourteenth embodiment. FIG. 17 is a cross-sectional view showing the image reading apparatus 2 and an original transport apparatus 3 of a fourteenth embodiment.

As shown in FIG. 17, the image reading apparatus 81 of the fourteenth embodiment is combined with the original transport apparatus 3 shown in FIG. 2 so as to be used for the image forming apparatus 1 shown in FIG. 1.

The image reading apparatus 81 includes, for example, the original placement glass 41, the original reading glass 42, a first scanning unit 83, a second scanning unit 84, an imaging lens 85 and a CCD (Charge Coupled Device) 86. The first scanning unit 83 includes an illuminating device 91 and a first reflecting mirror 92. While the first scanning unit 83 is moved at a constant speed V by a distance corresponding to the size of the original in the sub-scanning direction Y, the original on the original placement glass 41 is illuminated by the illuminating device 91. Then, the reflected light is reflected by the first reflecting mirror 92 and guided to the second scanning unit 84, thus an image on the surface of the original is scanned in the sub-scanning direction Y. The second scanning unit 84 includes second and third reflecting mirrors 93 and 94. While moving at a speed V/2 following the first scanning unit 83, the second scanning unit 84 reflects the reflected light from the original by the second and third reflecting mirrors 93 and 94 so that the light is guided to the imaging lens 85. The reflected light from the original is collected to the CCD 86 by the imaging lens 85 to form the image on the surface of the original on the CCD 86. The CCD 86 repeatedly scans the image on the surface of the original in the main-scanning direction.

The first and second scanning units 83 and 84 include respective pulleys (not shown) between which a wire (not shown) is bridged. The wire is driven by a stepping motor, thus the first and second scanning unit 83 and 84 are synchronized and moved.

When reading the image on the surface of the original transported by the original transport apparatus 3, the first scanning unit 83 is moved below the original reading glass 42 and the second scanning unit 84 is positioned according to the position of the first scanning unit 83. In such a state, the transportation of the original is started by the original transport apparatus 3. The original is drawn out of the original placement tray 56 and is transported, on the original reading glass 42, in the sub-scanning direction Y so as to be discharged to the discharge tray 57.

When the original is transported, the surface of the original is illuminated by the illuminating device 91 of the first scanning unit 83 through the original reading glass 42. The reflected light from the surface of the original is guided to the imaging lens 85 by respective reflecting mirrors of the first and second scanning units 83 and 84. The reflected light from the surface of the original is collected to the CCD 86 by the imaging lens 85 to form the image on the surface of the original on the CCD 86. In this way, the image on the surface of the original is read.

Figure 18:
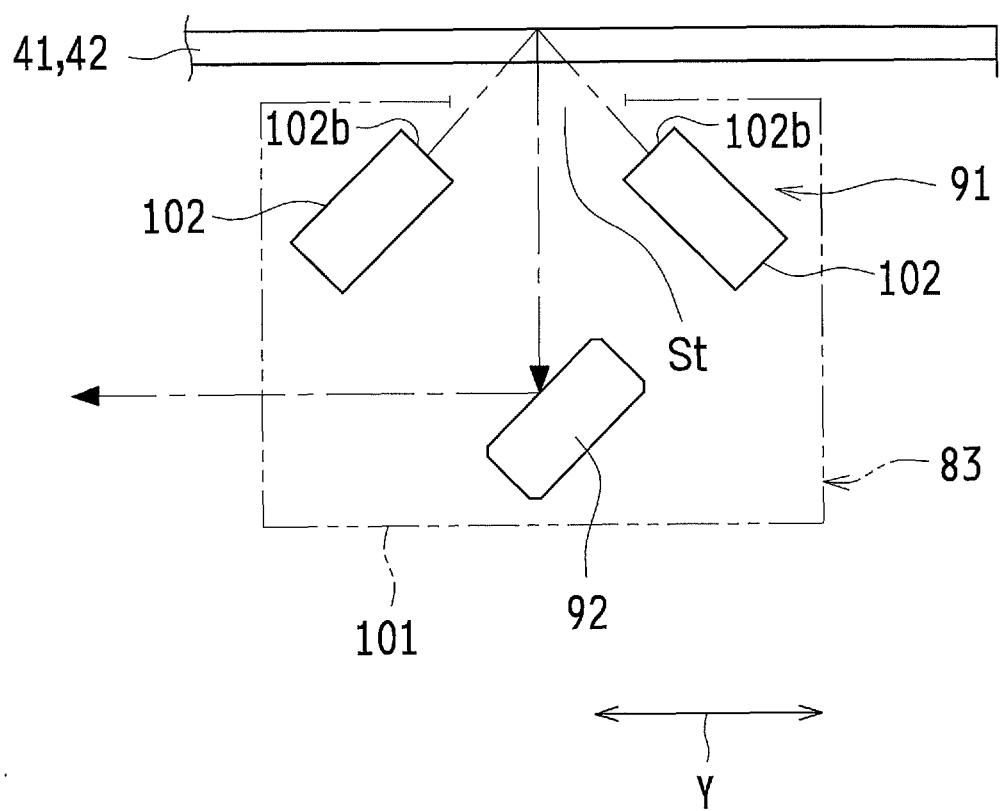
FIG. 18 is a schematic side view showing a first scanning unit and an illuminating device of the image reading apparatus shown in FIG. 17.
Figure 19:
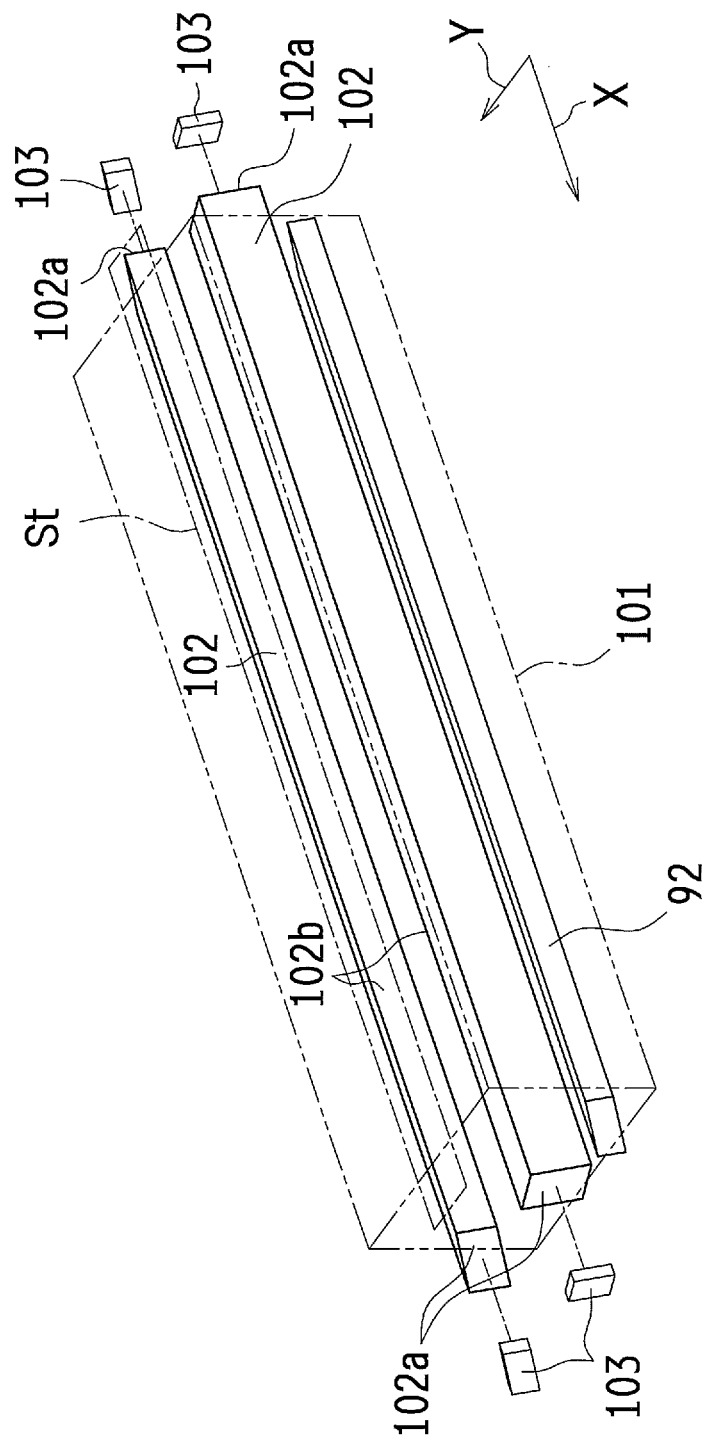
FIG. 19 is a schematic perspective view showing the first scanning unit and the illuminating device, viewed obliquely from above.

Next, description will be given on the illuminating device 91 of the first scanning unit 83. FIG. 18 is a schematic side view showing the first scanning unit 83 and the illuminating device 91. FIG. 19 is a schematic perspective view showing the first scanning unit 83 and the illuminating device 91, viewed obliquely from above. As shown in FIGS. 18 and 19, the first scanning unit 83 includes a casing 101 that has the slit St extending in the main-scanning direction X, the illuminating device 91 supported by the casing 101 and the first reflecting mirror 92 embedded in the casing 101. The illuminating device 91 includes respective elongated light guiding bodies 102 parallelly arranged to each other on both sides of the slit St, and LEDs (light emitting devices) 103 disposed so as to face the respective light incident surfaces 102a of both ends of each light guiding body 102.

With respect to each light guiding body 102, light from each LED 103 is incident to the light guiding body 102 from the corresponding light incident surface 102a of each side of the light guiding body 102, and emitted from the light emitting surface 102b of the light guiding body 102. The original is irradiated by the light emitted from the light emitting surface 102b of each light guiding body 102 through the original placement glass 41 or the original reading glass 42. The light reflected by the original is incident to the slit St through the original placement glass 41 or the original reading glass 42, thus the reflected light is incident to the first reflecting mirror 92 through the slit St.

In the above configuration of the illuminating device 91, both ends of the respective light guiding bodies 102 and the LEDs 103 are disposed on both outsides of the casing 101 of the first scanning unit 83, as shown in FIG. 19. Thus, heat dissipation efficiency of both ends of each light guiding body 102 and the respective LEDs 103 is improved. In order to support the light guiding bodies 102 and the LEDs 103 on both outsides of the casing 101, a member similar to the cover-like holding member 62 of the first embodiment can be disposed in the opening of the casing 101. In such a case, it is possible to dispose the LED substrates 64 and the heat dissipation plates 65 on both sides of the each light guiding body 102. Furthermore, a space may be disposed around each heat dissipation plate 65 so as to improve heat dissipation efficiency of the heat dissipation plate 65. Also, the slit St may be extended outside the casing 101 so as to generate air convection that passes through the slit St.

While the preferred embodiments of the present invention and its variations have been described with reference to the drawings, the present invention should not be limited thereto. It will be obvious to those skilled in the art that various changes and modifications may be made within the scope of the appended claims. Furthermore, all such changes and modifications are deemed to be within the scope of the present invention.

REFERENCE NUMERALS OF THE INVENTION

1 Image forming apparatus
2 Image reading apparatus
3 Original transport apparatus
4 Printing unit
5 Sheet feed cassette
11 Optical scanner
12 Development device
13 Photosensitive drum
14 Drum cleaning device
15 Charging unit
17 Fixing device
21 Intermediate transfer belt
26 Secondary transfer device
43 Scanning unit
45 Illuminating device
46 Imaging lens
47, 86 CCD (reading portion)
51-55 First-fifth reflecting mirrors
61 Casing
62 Cover-like holding member (holding member)
63 CCD substrate
64 LED substrate (substrate)
65 Heat dissipation plate
71, 71A, 71B Light guiding body
71a Light emitting surface
71b Light incident surface
71d Light reflecting surface
71e Light emitting quantity adjusting portion
72 LED (light emitting device)

What is claimed is:

1. A light guiding body comprising:
a long translucent body;
a light incident surface formed at an end of the body in a longitudinal direction of the body;
a light emitting surface formed on one side surface of the body along the longitudinal direction of the body; and
a light emitting quantity adjusting portion formed on the other side surface of the body along the longitudinal direction of the body so as to be opposite to the light emitting surface,
the light guiding body being configured to: guide, in the body, light that is incident to the light incident surface; reflect the light by the light emitting quantity adjusting portion; and emit the light from the light emitting surface,
wherein a width of the light emitting quantity adjusting portion in a direction perpendicular to the longitudinal direction of the body is varied according to a position in the width in the longitudinal direction of the body,
a width of the light emitting surface and the width of the light emitting quantity adjusting portion are coincident with a width of the body, and
the width of the light emitting quantity adjusting portion in the direction perpendicular to the longitudinal direction is gradually narrowed as the position in the width becomes closer to the end of the body in the longitudinal direction of the body.

2. An illuminating device comprising:
the light guiding body according to claim 1; and
a light emitting device emitting light to the light incident surface of the light guiding body.

3. An image reading apparatus comprising:
the illuminating device according to claim 2; and
a reading portion reading an irradiated object illuminated by the light emitted from the light emitting surface of the light guiding body of the illuminating device.

4. An image reading apparatus, comprising:
a long translucent light guiding body;
a light emitting device disposed on an end of the light guiding body in a longitudinal direction of the light guiding body;
a reading portion reading an irradiated object; and
a casing supporting the light guiding body,
the image reading apparatus being configured to: make light emitted from the light emitting device incident to a light incident surface formed at the end of the light guiding body in the longitudinal direction of the light guiding body; guide the light in the light guiding body; illuminate the irradiated object by the light emitted from a light emitting surface of the light guiding body along the longitudinal direction of the light guiding body; make a reflected light reflected by the irradiated object incident to the reading portion through an inside of the casing; and read the irradiated object by the reading portion,
wherein the end of the light guiding body protrudes outside the casing from a side end of the casing, the image reading apparatus further comprising a supporting member supporting the light guiding body and the light emitting device, the supporting member being disposed in an opening of the casing that faces the irradiated object, wherein an end of the supporting member protrudes, together with the light guiding body, outside the casing from the side end of the casing the supporting member is disposed along the longitudinal direction of the light guiding body and has a slit through which the reflected light reflected by the irradiated object passes to enter the inside of the casing, and the slit extends outside the casing, the supporting member includes: shielding portions that cover, except for the slit, an upper opening of the casing; and connecting portions that are connected to respective ends of the shielding portions.

5. The image reading apparatus according to claim 4, wherein a heat dissipation plate that dissipates heat of the light emitting device is disposed at the end of the supporting member.

6. The image reading apparatus according to claim 4, wherein a substrate on which the light emitting device is mounted and a heat dissipation plate that makes contact with the substrate are disposed at the end of the supporting member.

7. The image reading apparatus according to claim 5, wherein spaces are provided: in an outward direction opposite to the light guiding body relative to the heat dissipation plate; in a vertical direction of the heat dissipation plate; and on both sides of the heat dissipation plate in a horizontal direction thereof perpendicular to the outward direction and the vertical direction.

8. The image reading apparatus according to claim 6, wherein spaces are provided: in an outward direction opposite to the light guiding body relative to the heat dissipation plate; in a vertical direction of the heat dissipation plate; and on both sides of the heat dissipation plate in a horizontal direction thereof perpendicular to the outward direction and the vertical direction.

9. An image forming apparatus comprising:

the image reading apparatus according to claim 3; and a printing unit printing, on a recording sheet, an image on the irradiated object and read by the image reading apparatus.

10. An image forming apparatus comprising:

the image reading apparatus according to claim 4; and a printing unit printing, on a recording sheet, an image on the irradiated object and read by the image reading apparatus.

* * * * *